United States Patent
Kim et al.

(12)

(10) Patent No.: US 9,294,332 B2
(45) Date of Patent: Mar. 22, 2016

(54) METHOD AND APPARATUS FOR IUT IN A WIRELESS COMMUNICATION SYSTEM

(75) Inventors: Laeyoung Kim, Anyang-si (KR); Taehyeon Kim, Anyang-si (KR); Hyunsook Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 259 days.

(21) Appl. No.: 13/985,960

(22) PCT Filed: Apr. 6, 2012

(86) PCT No.: PCT/KR2012/002634
§ 371 (c)(1),
(2), (4) Date: Aug. 16, 2013

(87) PCT Pub. No.: WO2012/138178
PCT Pub. Date: Oct. 11, 2012

(65) Prior Publication Data
US 2013/0322312 A1    Dec. 5, 2013

Related U.S. Application Data

(60) Provisional application No. 61/473,158, filed on Apr. 8, 2011, provisional application No. 61/551,453, filed on Oct. 26, 2011.

(51) Int. Cl.
*H04L 29/06* (2006.01)
*H04W 76/04* (2009.01)

(52) U.S. Cl.
CPC ...... *H04L 29/06319* (2013.01); *H04L 65/1016* (2013.01); *H04L 65/1063* (2013.01); *H04L 65/1093* (2013.01); *H04W 76/04* (2013.01)

(58) Field of Classification Search
None
See application file for complete search history.

(56) References Cited

U.S. PATENT DOCUMENTS

| 2009/0245180 | A1* | 10/2009 | Wu ................................ 370/328 |
| 2010/0279670 | A1  | 11/2010 | Ghai et al. |
| 2010/0312841 | A1  | 12/2010 | Doken et al. |
| 2011/0040836 | A1* | 2/2011  | Allen et al. .................... 709/205 |
| 2011/0182235 | A1* | 7/2011  | Shaheen et al. ............... 370/328 |
| 2011/0320569 | A1  | 12/2011 | Kim et al. |
| 2012/0203860 | A1* | 8/2012  | Valerius et al. ............... 709/217 |

FOREIGN PATENT DOCUMENTS

| KR | 10-2010-0115184 A | 10/2010 |
| KR | 10-2011-0001696 A | 1/2011 |

* cited by examiner

*Primary Examiner* — Ayaz Sheikh
*Assistant Examiner* — Tarell Hampton
(74) *Attorney, Agent, or Firm* — Birch, Stewart, Kolasch & Birch, LLP

(57) ABSTRACT

The present invention relates to a wireless communication system, and more particularly, to a method and apparatus for performing or supporting inter-UE transfer (IUT). The method for performing relevant IUT operations by first user equipment and second user equipment according to one embodiment of the present invention comprises: a step of receiving a message including an IUT request from the first UE; a step of transmitting information associated with the IUT request to a remote party; and a step of performing the IUT operation if the IUT request is granted by the remote party.

11 Claims, 24 Drawing Sheets

METHOD AND APPARATUS FOR IUT IN A WIRELESS COMMUNICATION SYSTEM

CROSS REFERENCE TO RELATED APPLICATIONS

This non-provisional application is a National Stage entry under U.S.C. §371 of International Application No. PCT/KR2012/002634 filed on Apr. 6, 2012, which claims the benefit of U.S. Provisional Application Nos. 61/473,158 filed on Apr. 8, 2011 and 61/551,453 filed on Oct. 26, 2011. The entire contents of all of the above applications are hereby incorporated by reference.

TECHNICAL FIELD

The present invention relates to a wireless communication system, and more particularly, to a method and apparatus for performing or supporting inter-UE transfer (IUT).

BACKGROUND ART

An Internet protocol (IP) multimedia subsystem (IMS) is an architectural framework for transferring an IP multimedia service in various wired/wireless communication networks. In IMS, a protocol such as a session initiation protocol (SIP) applicable to various networks is used. SIP is a signaling protocol for controlling a multimedia service session through an IP and may be used to establish, correct and finish a unicast or multicast session. That is, IMS assists a user in easily accessing multimedia and audio data through various wired/wireless device(s).

Session(s) including one or more media flows (or media streams) may be configured through IMS. An IMS session may be expressed by a logical connection between a local side and a remote side via IMS network nodes. A counterpart user equipment (UE) or server of a local-side UE may be referred to as a remote end or remote party. That is, the remote end transmits and receives a media flow to and from the local-side UE via an IMS network.

A logical set of IMS sessions configured by a plurality of UEs may be referred to as a collaborative session. A controller UE controls a collaborative session and a controlled UE transmits and receives a media flow without collaborative session control rights. Collaborative session control may include collaborative session release, supplementary service call, inter-UE transfer (IUT) initiation, etc. IUT means that all or some of media flows and/or collaborative session control rights are transferred, replicated or shared between UEs.

DISCLOSURE

Technical Problem

In IUT operation of a local side, it is necessary to prevent a media flow from being transferred, replicated or shared without restriction. Such IUT restriction serves to protect user privacy of a remote end or to protect copyrighted content. In order to satisfy service requirements related to IUT restriction, conventionally, since IUT restriction is provided by agreement about IUT services of network operators, a static uniform IUT restriction was applied to all subscribers of a network to which a remote end belongs. That is, a method of dynamically and/or individually applying IUT restriction to a UE or a UE group has not been provided.

An object of the present invention devised to solve the problem lies in a method of dynamically or individually applying IUT restriction to a UE or a UE group in IUT operation.

The technical problems solved by the present invention are not limited to the above technical problems and other technical problems which are not described herein will become apparent to those skilled in the art from the following description.

Technical Solution

The object of the present invention can be achieved by providing a method of, at an internet protocol multimedia subsystem (IMS) network device, performing inter-user equipment (UE) transfer (IUT) operation between a first UE and a second UE, including receiving a message including an IUT request from the first UE, transmitting IUT request related information to a remote end, and performing the IUT operation if the remote end accepts the IUT request.

In another aspect of the present invention, provided herein is a Internet protocol multimedia subsystem (IMS) network device which performs inter-UE transfer (IUT) operation between a first user equipment (UE) and a second UE, including a transmission/reception module configured to transmit and receive a signal to and from an external device, and a processor configured to control the transmission/reception module, wherein the processor is configured to receive a message including an IUT request from the first UE via the transmission/reception module, to transmit IUT request related information to a remote end via the transmission/reception module, and to perform the IUT operation if the remote end accepts the IUT request.

The embodiments of the present invention have the following features.

If the remote end restricts the IUT request, the IUT operation may not be performed.

The message including the IUT request may be transmitted from the first UE in one of the case in which a media flow progresses between the first UE and the remote end, the case in which a media flow progresses between the second UE and the remote end, the case in which initiation of a session including a media flow between the first UE and the remote end and a media flow between the second UE and the remote end is requested, or the case in which a session initiation request for the first UE is transmitted from the remote end to the first UE.

The transmitting the IUT request related information to the remote end may be performed in one or more of the case in which authentication or verification of one or more of a source UE of the IUT request or a target UE of the IUT request is successful, the case in which the transmitting the IUT request related information to the remote end is accepted by operator policy, or the case in which the transmitting the IUT request related information to the remote end is accepted by preference of one or more of the source UE of the IUT request or the target UE of the IUT request.

The IUT request related information may include at least one of information indicating reception of the IUT request, attributes of the requested IUT operation, identification of a target UE of the requested IUT operation, or information about a media flow related to the requested IUT operation.

The attributes of the requested IUT operation may indicate one or more of session initiation requests including media transfer, replication, addition or IUT operation.

The transmitting the IUT request related information to the remote end may be performed after setting an access leg with a target UE of a media flow related to the IUT operation or before setting an access leg with a target UE of a media flow related to the IUT operation.

The method may further include receiving, from the remote end, a message indicating that the IUT request is accepted.

A response message may be transmitted to one or more of the first UE or the second UE depending on whether the remote end accepts the IUT request.

The IMS network device may be a service centralization and continuity application server (SCC AS) which serves a UE for controlling a collaborative session established by the IUT operation.

The receiving the message and the transmitting the IUT request related information may be performed via a call session control function (CSCF).

The general description and the following detailed description of the present invention are exemplary and are provided as additional description of the claims.

Advantageous Effects

According to the present invention, it is possible to provide a method of dynamically or individually applying IUT restriction to a UE or a UE group in IUT operation.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Figure 1:
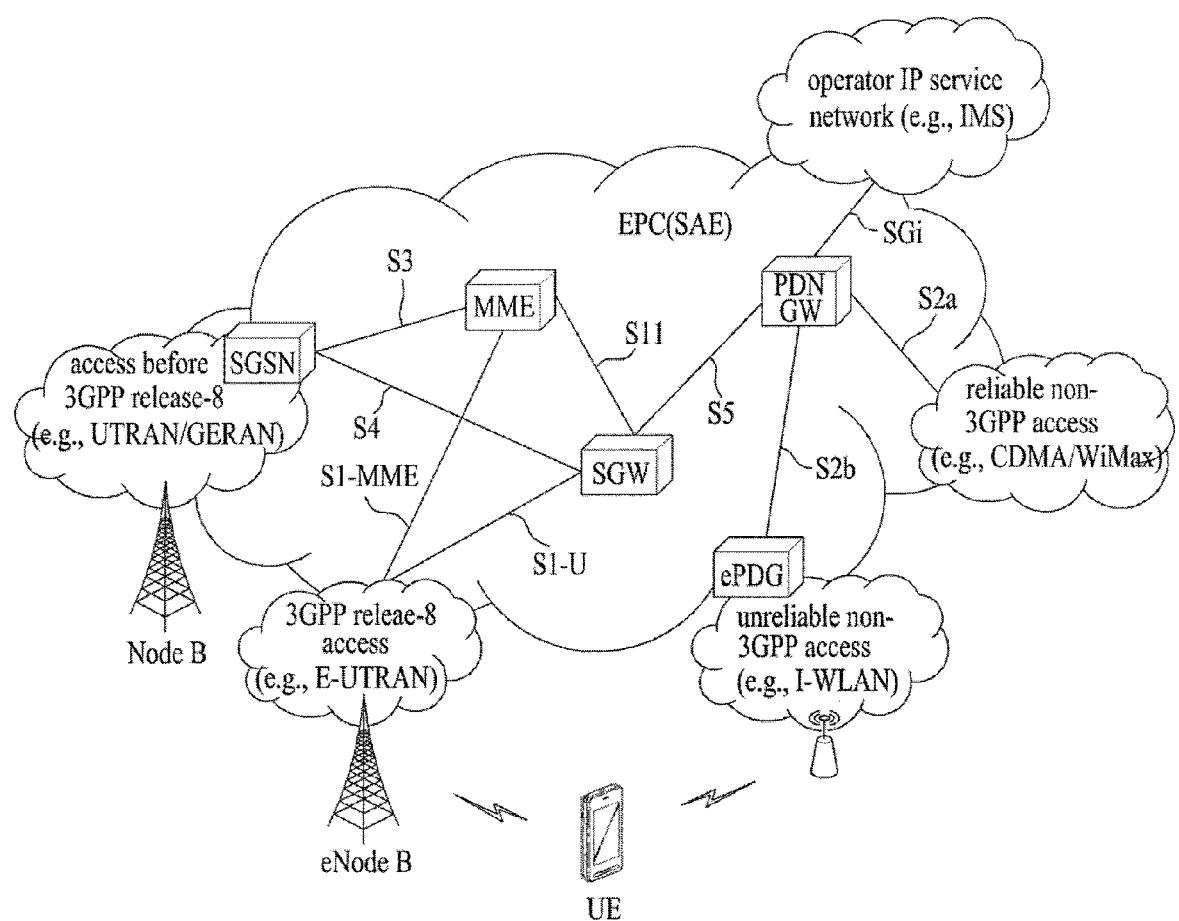
FIG. 1 is a schematic diagram showing the structure of an evolved packet core (EPC).

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following techniques may be used for various wireless communication systems. For clarity, hereinafter, although a 3GPP LTE system and a 3GPP LTE-A system are focused upon, the present invention is not limited thereto.

The terms used in the present specification are defined as follows.

UE: User equipment which is also referred to as a terminal, a mobile equipment (ME), a mobile station, etc. In addition, the UE may be a portable device such as a laptop, a mobile phone, a personal digital assistant (PDA), a smart phone or a multimedia device or a non-portable device such as a personal computer (PC) or a vehicle-mounted device.

IP multimedia subsystem (IMS): Subsystem for providing a multimedia service based on an Internet protocol (IP).

IMS registration: Process of, at a UE, informing a home IMS network of information about a current location of the UE.

IP multimedia public user identity (IMPU): Identity of an IMS user. The IMS user may have one or more IMPUs for communication with another user. In addition, a plurality of UEs may share one IMPU. The IMPU has an SIP uniform resource identifier (URI) form or a Tel URI (resources identified by a telephone number) form.

Globally Routable User Agent URI (GRUU): Identifier composed of a combination of instance-ID of an IMPU and a UE. The GRUU may serve to identify a specific UE from UEs using the same IMPU.

Application Server (AS): Server for providing various multimedia services.

Multi-media session continuity: Support terminal mobility or mobility between UEs while maintaining session continuity.

Service centralization and continuity application server (SCC AS): Application server supporting multimedia session continuity (see 3GPP TS 23.292 and 3GPP TS 23.237).

Remote party or remote end: Counterpart UE or counterpart application server communicating with a UE. Device for performing transmission and/or reception of a media flow at a remote side.

Access leg: Logical connection between a local-side UE and an IMS network node.

Inter-UE transfer (IUT): Operation for delivering (transferring, replicating or sharing) some or all of media flows in a session and/or service control rights between UEs (see 3GPP TS 23.237).

Collaborative session: Logical set of IMS sessions over two or more UEs. A plurality of IMS sessions is anchored on an SCC AS to be combined into one IMS collaborative session.

Controller UE: UE for controlling a collaborative session. A service profile of a controller UE decides a service for a remote leg to a remote end which is a communication counterpart of a collaborative session. The controller UE may provide a media flow for a collaborative session (that is, may transmit and/or receive a media flow). In addition, the controller UE may request IUT media control related procedures.

Controlled UE: UE for providing a media flow for a collaborative session (that is, transmitting and/or receiving a media flow). The controlled UE may request IUT media control related procedures and, at this time, authorization for this request depends on the controller UE. A plurality of controlled UEs may be present in a cooperative session.

Hosting SCC AS: SCC AS for managing a dialog with a remote end for performing communication with respect to a collaborative session. That is, the hosting SCC AS serves a collaborative session.

IUT media control related procedures: Control operation for a media flow in a collaborative session or control operation requiring authorization of a controller UE in a collaborative session. The IUT media control related procedures may correspond to the ability to transfer/add/replicate a media flow or the ability to remove/correct a media flow of another UE.

Collaborative session control: Control operation performed by a controller UE in a collaborative session. Collaborative session control is also referred to as control rights for a collaborative session. Collaborative session control may correspond to the ability to release a collaborative session, to call supplementary services or to authorize a request for IUT media control related procedures from another UE.

Multimedia resource function (MRF): IP media server for controlling a media streaming function. MRF includes a multimedia resource function controller (MRFC) and a multimedia resource function processor (MRFP).

Call session control function (CSCF): Server or proxy server for processing SIP packets in IMS. This may be divided into a proxy-CSCF (P-CSCF), a serving CSCF (S-CSCF) and an Interrogating-CSCF (I-CSCF).

FIG. 1 is a schematic diagram showing the structure of an evolved packet core (EPC).

EPC is a core element of system architecture evolution (SAE) for improving performance of 3GPP technologies. SAE corresponds to a research project for deciding a network structure supporting mobility between various types of networks. SAE aims at supporting various radio access technologies based on an IP and providing an optimized packet based system for providing improved data transmission capability.

More specifically, EPC is a core network of an IP mobile communication system for a 3GPP LTE system and can support a packet-based real-time and non-real-time service. In an existing mobile communication system (that is, a second or third generation mobile communication system), a core network function was implemented through two sub-domains, that is, a circuit-switched (CS) sub-domain for voice and a packet-switched (PS) sub-domain for data. However, in a 3GPP LTE system which is evolved from a third generation mobile communication system, CS and PS sub-domains are unified to one IP domain. That is, in a 3GPP LTE system, connection between UEs having an IP capability may be established through an IP based base station (e.g., eNodeB (evolved Node B)), an EPC or an application domain (e.g., IMS). That is, EPC is an essential structure for implementing an end-to-end IP service.

EPC may include various components and FIG. 1 shows a serving gateway (SGW), a packet data network gateway (PDN GW), a mobility management entity (MME), a serving general packet radio service (GPRS) supporting node (SGSN) and an enhanced packet data gateway (ePDG).

The SGW serves as a boundary point between a radio access network (RAN) and a core network and performs a function for maintaining a data path between an eNodeB and a PDN GW. In addition, if a UE moves over an area served by an eNodeB, the SGW serves as a local mobility anchor point. That is, for mobility within an evolved-universal mobile telecommunication system (E-UMTS) terrestrial radio access network (E-UTRAN) defined after 3GPP Release 8, packets may be routed via the SGW. In addition, the SGW may function as an anchor point for mobility management with another 3GPP network (an RAN defined before 3GPP Release 8, e.g., UTRAN or global system for mobile communication (GSM)/enhanced data rates for global evolution (EDGE) radio access network (GERAN)).

The PDN GW corresponds to a termination point of a data interface to a packet data network. The PDN GW may support policy enforcement features, packet filtering, charging support, etc. In addition, the PDN GW may serve as an anchor point for mobility management with a 3GPP network and a non-3GPP network (e.g., an unreliable network such as an interworking wireless local area network (I-WLAN) or a reliable network such as a code division multiple access (CDMA) network or WiMax).

Although the SGW and the PDN GW are configured as separate gateways in the example of the network structure of FIG. 1, two gateways may be implemented according to a single gateway configuration option.

The MME performs signaling and control functions supporting access to network connection of a UE, network resource allocation, tracking, paging, roaming and handover. The MME controls control plane functions related to subscriber and session management. The MME manages numerous eNodeBs and performs signaling for selection of a conventional gateway for handover for other 2G/3G networks. In addition, the MME performs functions such as security procedures, terminal-to-network session handling, idle terminal location management, etc.

The SGSN handles all packet data such as user mobility management and authentication for other 3GPP networks (e.g., GPRS network).

The ePDG serves as a security node for an unreliable non-3GPP network (e.g., I-WLAN, WiFi, hot spot, etc.).

As described with reference to FIG. 1, a UE having IP capabilities may access an IP service network (e.g., IMS)

provided by an operator via various elements in an EPC not only based on 3GPP access but also non-3GPP access.

Figure 2:
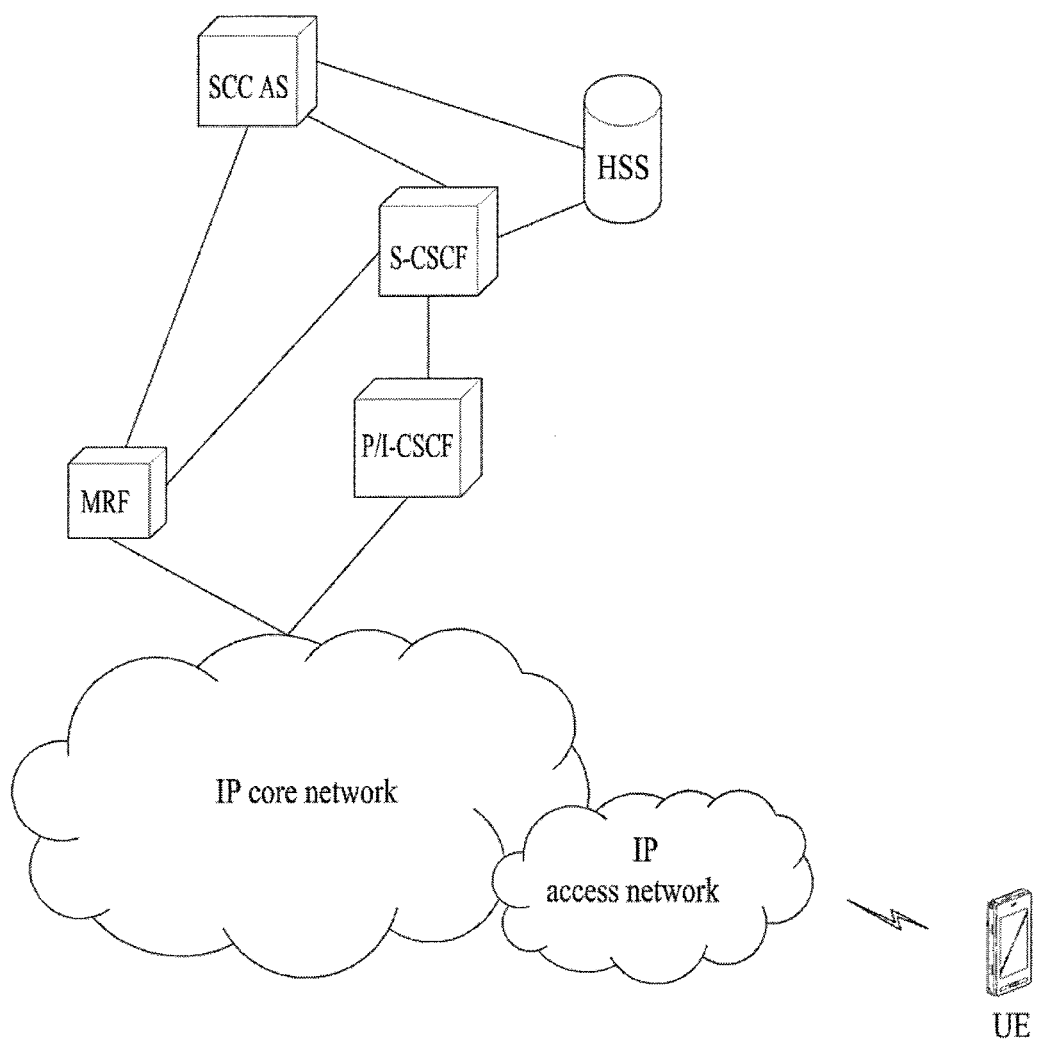
FIG. 2 is a schematic diagram showing the structure of an IMS based wireless communication system.

FIG. 2 is a schematic diagram showing the structure of an IMS based wireless communication system.

The IMS based wireless communication system may include various components. FIG. 2 shows a UE, access and core networks, an MRF, a P/I-CSCF, an S-CSCF, an AS and a home subscriber server (HSS).

The UE may perform communication with IMS-related nodes and/or other UEs via the IP radio access and core networks such as an E-UTRAN. The UE having IP capabilities may have a unique ID (e.g., an IMPU ID such as an SIP URI or a Tel URI) and an IP address.

The MRF corresponds to a server for providing a media-related function such as media adjustment (e.g., audio stream mixing) and includes an MRFC and an MRFP. The MRFC serves to interpret information from the S-CSCF and to control the MRFP. The MRFP serves to mix, provide or process media streams.

The P-CSCF is an SIP proxy server which is a contact point for an IMS UE. The P-CSCF may perform a function for protecting a message between a network and a UE and a function for allocating resources to a media flow.

The I-CSCF is an SIP server which is a contact point from a peered network. The I-CSCF may perform a function for querying an HSS in order to decide an S-CSCF for a UE.

The S-CSCF is a server for handling SIP registration and performing UE positioning, UE authorization and call processing (e.g., call routing). For example, if a UE needs to register with an IMS network, a UE registration message including information such as a media kind supported by the UE, codec related information or screen size may be delivered to the S-CSCF via the P-CSCF. Operation of the S-CSCF may be controlled according to a policy stored in the HSS.

The SCC AS is a home network based IMS application for providing functions required for an IMS centralized service and service continuity of multimedia sessions.

The HSS may perform functions such as configuration storage, identity management, user state storage, etc.

Figure 3:
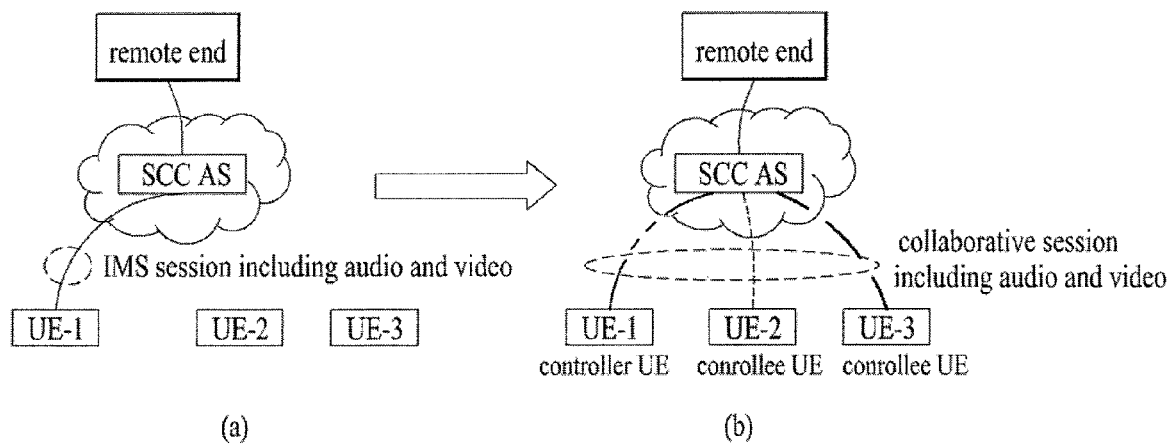
FIGS. 3 to 5 are diagrams illustrating IUT.
Figure 4:
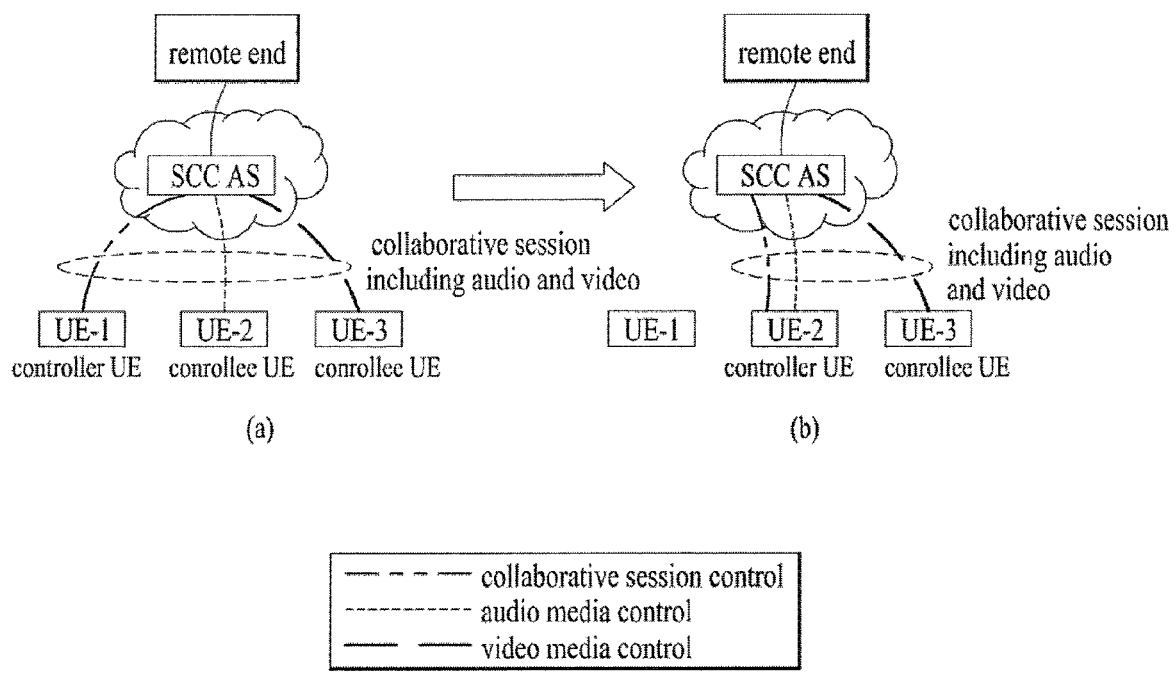
Figure 5:
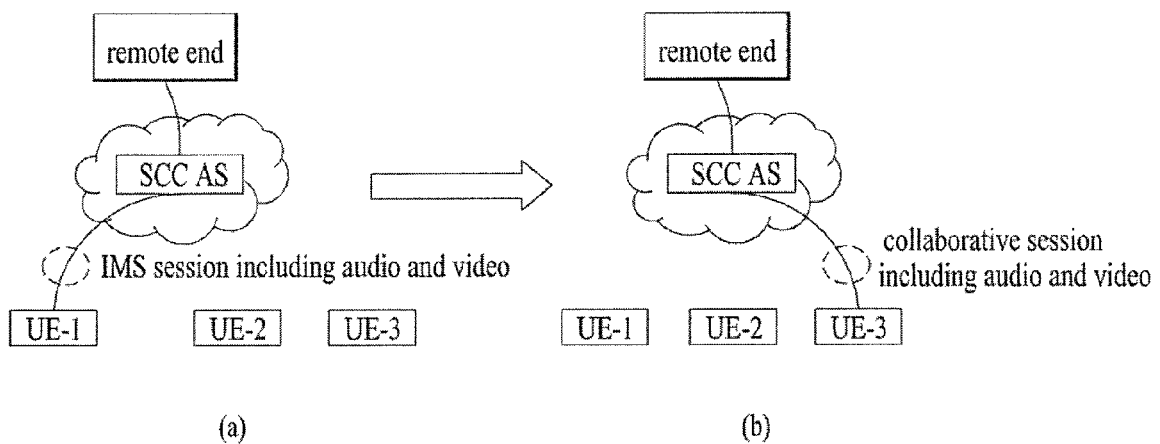

FIGS. 3 to 5 are diagrams illustrating IUT.

In the examples shown in FIGS. 3 to 5, a plurality of UEs UE-1, UE-2 and UE-3 may be related UEs belonging to one user domain and independent UEs belonging to different user domains. In the examples of FIGS. 3 to 5, for convenience of description, assume that UE-1, UE-2 and UE-3 are related UEs belonging to one user domain. However, this is only exemplary and UE-1, UE-2 and UE-3 may be independent UEs belonging to different user domains. Although only three UEs are shown in the examples of FIGS. 3 to 5, a larger number of related UEs may be present.

FIG. 3 shows an example in which a collaborative session is established by IUT of a media flow.

In the example of FIG. 3(a), assume that a user progresses with respect to a session including an audio and video media with a remote end (e.g., a service provider) via UE-1. Such session control may be performed by an SCC AS. Here, assume that the user will progresses with respect to the session with the remote end via UE-2 and UE-3. For example, UE-1 is a cellular phone, UE-2 is an earset or a headset having a communication function, and UE-3 is a display having a communication function. In addition, assume that the user wishes to progress in an audio media session via UE-2 (that is, the earset or headset) and to progress in a video media session via UE-3 (that is, the display).

In this case, as shown in FIG. 3(b), in the session including the audio and video media, which has been established via UE-1, the audio media flow is transferred to UE-2 and the video media flow is transferred to UE-3. At this time, even after the audio and video media flows are respectively transferred to UE-2 and UE-3, UE-1 maintains control rights for the media flows. That is, UE-1 corresponds to a controller UE and UE-2 and UE-3 correspond to controlled UEs. The session including the audio and video media flows, in which UE-1, UE-2 and UE-3 participate, corresponds to a collaborative session.

FIG. 4 shows an example of collaborative session control IUT.

In the example of FIG. 4(a), assume that a user progresses with respect to a session including an audio media flow using UE-2 and progresses with respect to a session including a video media flow using UE-3 and such media flows (that is, collaborative sessions) are being controlled via UE-1. At this time, the user may hand control rights of UE-1 over to UE-2. That is, the example of FIG. 4 does not correspond to the IUT of the media flow shown in FIG. 3 but corresponds to the IUT of collaborative session control (or collaborative session control rights).

In this case, as shown in FIG. 4(b), UE-2 progresses with respect to the session including the audio media flow and has control rights for the collaborative session in which UE-2 and UE-3 participate. UE-3 progresses with respect to the session including the video media flow without change. In this case, UE-2 is a controller UE, UE-3 is a controlled UE, and UE-1 no longer belongs to the collaborative session.

FIG. 5 shows an example of IUT in which a collaborative session is not established.

In the example of FIG. 5(a), a user progresses with respect to a session including audio and video media flows with a remote end via UE-1. Here, assume that the user wishes to transfer both audio and video media flow session rights to UE-3. In this case, as shown in FIG. 5(b), the session including the audio and video media flows continuously progresses via UE-3. In the example of FIG. 5(b), a collaborative session is not established.

Figure 6:
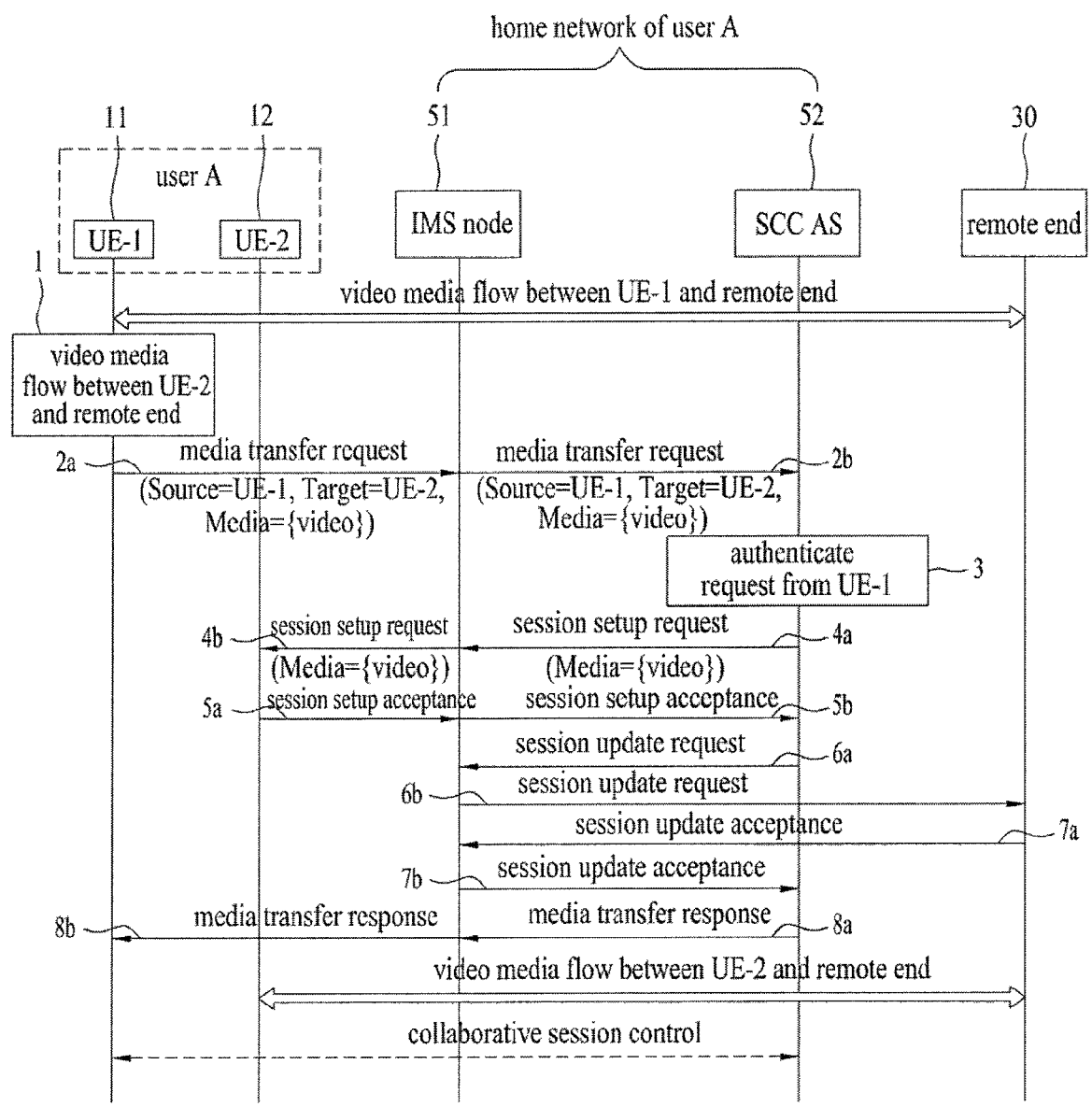
FIG. 6 is a flowchart illustrating an example of establishing a collaborative session according to IUT.

FIG. 6 is a flowchart illustrating an example of establishing a collaborative session according to IUT.

In the example of FIG. 6, assume that a UE-1 and a UE-2 are related UEs belonging to one user, e.g., user A. The present invention is not limited thereto and the same description may be applied to independent UEs belonging to different users. In addition, the same description may be applied to the case in which 2 or more related UEs are present.

An IMS network, to or with which the UEs of the user A are subscribed or registered, may mean a home network. If the UE(s) reside on a visited network, the UE(s) may be registered with the home network via the visited network. The home network includes an IMS node 51 and an SCC AS 52. Here, the IMS node 51 includes a CSCF such as a P-CSCF and an S-CSCF.

In the example of FIG. 6, assume that, in a state in which the user A progresses with respect to a session including a video media flow with the remote end 30 via the UE-1 11, the video media flow is handed over to the UE-2 12 while maintaining session continuity. Here, assume that, even after the user A transfers the video media flow to the UE-2 12, the UE-1 11 maintains control rights for the media flow.

In step 1 of FIG. 6, the UE-1 11 decides to transfer the video media flow configuring the session with the remote end 30 to the UE-2 12.

In steps 2a and 2b of FIG. 6, the UE-1 11 transmits a transfer request message (e.g., a media transfer request message) to the SCC AS 52 via the IMS node 51 in order to transfer the video media flow to the UE-2 12.

In step 3 of FIG. 6, the SCC AS 52 authenticates or verifies the transfer request message from the UE-1 11. Such authentication/verification may be performed based on subscriber information. For example, authentication/verification may include determining whether IUT of the UE-1 11 is accepted. Alternatively, authentication/verification may include determining whether the media on the UE-1 11 may be transferred to the UE-2 12.

In steps 4a and 4b of FIG. 6, the SCC AS 52 transmits, to the UE-2 12, a session setup (or session initiation) request message (e.g., an SIP based INVITE message) including information about the video media flow requested to be transferred, based on the transfer request message.

In steps 5a and 5b of FIG. 6, the UE-2 12 sends an acceptance message of the session setup request message to the SCC AS 52 via the IMS node 51.

In steps 6a and 6b of FIG. 6, the SCC AS 52 transmits, to the remote end 30, a session update request message (e.g., a Re-INVITE message) including changed items according to transfer of the video media flow via the IMS node 51.

In Steps 7a and 7b of FIG. 6, the remote end 30 transmits a session update acceptance message in response to the session update request from the SCC AS 52. Then, the session including the video media flow is established between the UE-2 12 and the remote end 30.

In steps 8a and 8b of FIG. 6, the SCC AS 52 transmits, to the UE-1 11, a response message (e.g., a media transfer response message) indicating that the requested IUT operation has finished.

The UE-1 11 has control rights for a collaborative session including the video media flow after the video media flow has been transferred to the UE-2 12. That is, the UE-1 11 is a controller UE and the UE-2 12 is a controlled UE.

In association with IMS IUT, in Release 11 of 3GPP TS 22.228, a service requirement "replication/transfer of some or all of media components to target IMS UE(s), belonging to the same or different user(s) that subscribe to the same operator, shall not be performed when a remote end (e.g., the source of the media) of the session restricts such operation" is newly defined.

Up to now, in order to satisfy such a service requirement, IUT restriction is provided by agreement for an IUT service between a network operator for providing IUT (that is, a home network operator to which local-side UEs belong) and a network operator for providing a service to a remote end (that is, a home network operator to which a remote-side UE or server belongs).

Figure 7:
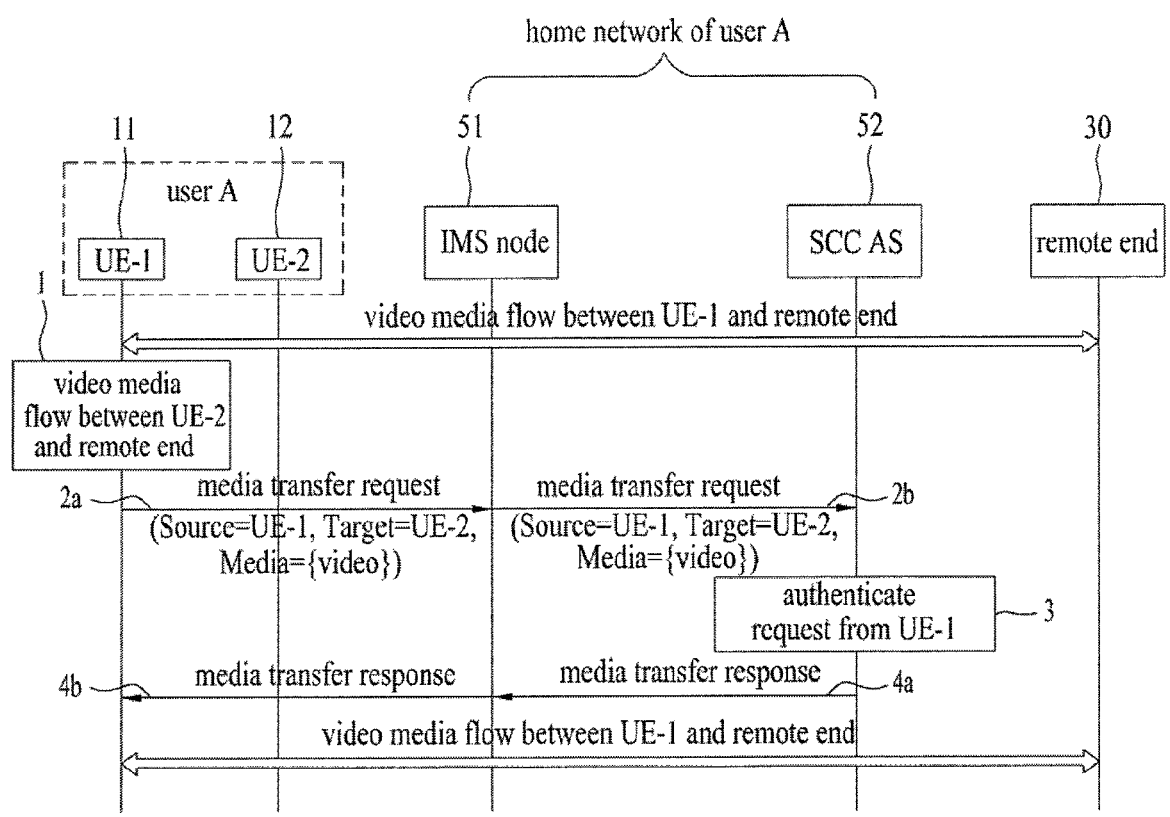
FIG. 7 is a flowchart illustrating an example of applying IUT restriction.

FIG. 7 is a flowchart illustrating an example of applying IUT restriction.

In step 1 of FIG. 7, the UE-1 11 decides to transfer a video media flow configuring a session with the remote end 30 to the UE-2 12.

In steps 2a and 2b of FIG. 7, the UE-1 11 transmits a transfer request message (e.g., a media transfer request message) to the SCC AS 52 via the IMS node 51 in order to transfer the video media flow to the UE-2 12.

In step 3 of FIG. 7, the SCC AS 52 authenticates or verifies the transfer request message from UE-1 11. Such authentication/verification may be performed based on subscriber information. For example, authentication/verification may include determining whether IUT of the UE-1 11 is accepted. Alternatively, authentication/verification may include determining whether the media on the UE-1 11 may be transferred to the UE-2 12.

Authentication and verification by the SCC AS 52 includes verification for IUT restriction. For example, a determination as to whether an IUT restriction request (provided via service agreement between a network to which the remote end belongs and a network to which the user A subscribes) of a network to which the remote end belongs is present is made. If the IUT restriction request is present, the SCC AS 52 decides that a transfer request received from the UE-1 11 is not accepted.

In steps 4a and 4b of FIG. 7, the SCC AS 52 transmits, to UE-1 11, a response message (e.g., a media transfer response message) indicating that the media transfer request has been rejected. After the transfer request of UE-1 has been rejected, the video media flow between the UE-1 11 and the remote end 30 is maintained.

IUT restriction of FIG. 7 is provided by service agreement between network operators and thus have overall static attributes. That is, the same IUT restriction is applied to all subscribers of the network to which the remote end belongs and is not changed without new service agreement.

For example, assume that the network (or operator) to which the remote end belongs is a network Y and users 1, 2 and 3 subscribing to the network Y are present. At this time, the user 1 may not wish that a communication counterpart thereof performs an IUT operation but the user 2 may wish or may not care that a communication counterpart thereof performs an IUT operation. The user 3 may or may not accept the IUT operation depending on a communication counterpart or according to attributes of the media flow. That is, preference of the users 1, 2 and 3 related to whether the IUT restriction is applied may correspond to "all application (restriction)", "non-application (accept) and "conditional application". However, since various requirements of users may not be satisfied by the method of applying IUT restriction of FIG. 7, a method of dynamically and/or individually applying IUT restriction according to UE or UE group is required.

Hereinafter, various embodiments of the present invention for performing IUT operation via a query/response as to whether IUT is accepted by a remote end will be described. More specifically, a detailed method of, at an IMS node, interacting with a remote end will be described. For example, a node (e.g., an SCC AS) of a network to which a UE for requesting IUT belongs may provide IUT request related information to a remote end and perform IUT operation based on a response (acceptance/rejection) of the remote end.

In the present invention, "IUT request related information" means information provided from the IMS node to the remote end in order to determine whether IUT is accepted. If a plurality of SCC ASs is involved in a collaborative session, a hosting SCC AS (e.g., an SCC AS for managing a dialog with the remote end) may generate IUT request related information to be provided to the remote end. In addition, the IUT request related information may be created and provided to the remote end if a request for IUT operation is generated. Here, the case in which the request for the IUT operation is generated includes 1) the case in which an IUT request is created while a session progresses and ii) the case in which a session is established and, at the same time, an IUT request is generated.

In the present invention, interaction between the IMS node (e.g., the SCC AS) and the remote end for confirming whether IUT is accepted may be performed by an existing message exchange procedure. For example, interaction between the IMS node and the remote node may be performed as i) part of message exchange operation (e.g., remote leg update operation) informing the remote end of session update if the IUT request is generated while the session progresses ii) part of operation for initiating (or setup) the session with the remote end if the session is established and, at the same time, the IUT request is generated. The present invention is not limited thereto and interaction between the IMS node (e.g., the SCC AS) and the remote end for confirming whether IUT is accepted may be performed by arbitrary message exchange operation (new message exchange procedure defined in association with IUT acceptance confirmation although not conventionally defined) for achieving the above purpose.

In the present invention, a determination as to whether operation for providing IUT request related information from the SCC AS to the remote end is performed may be made based on authentication or verification attributes of an IUT request UE and a UE for responding to an IUT request, operator policy and user preference, etc. More specifically, operation for providing IUT request related information from the SCC AS to the remote end may be performed if one or more of the following criteria are satisfied.

- If authentication and verification of a UE which originates an IUT request (that is, a source UE of the IUT request) and a UE which receives an IUT request (that is, a target UE of the IUT request) is successful, the SCC AS may provide the IUT request related information to the remote end.
- The IUT request may be classified according to operator policy to determine whether the SCC AS provides the IUT request related information to the remote end. As an example of operator policy, the SCC AS may provide the IUT request related information to the remote end with respect to all IUT requests. In addition, the IUT requests may be classified according to granularity and/or criteria. In addition, a determination as to whether the SCC AS provides IUT request related information to the remote end may be made with respect to all or some of classes of the IUT request.
- A determination as to whether the SCC AS provides the IUT request related information to the remote end may be made based on preference of the user (or the subscriber) to which the source UE of the IUT request belongs (that is, the UE which originates the IUT request) and/or preference of the user (or the subscriber) to which the target UE of the IUT request belongs (that is, the target UE of the IUT request).

In the present invention, the IUT request related information provided from the SCC AS to the remote end may include at least one of the followings. The present invention is not limited to the following examples and the IUT request related information may include a variety of information related to the IUT request received by the SCC AS.

- Indication indicating that the IUT request has been received
- Information to which operation the received IUT request corresponds (e.g., session initiation request such as media transfer, media replication, media addition, or IUT operation)
- Information about a target UE by which IUT operation is performed (e.g., an identifier (IMPU, GRUU, etc.) of the target UE of the media flow and/or an IP address of the target UE of the media flow)
- Information about the media for which IUT operation is performed.

The IUT request may be generated by the local UE or the remote end. Similarly, the UE which responds to the IUT request may be the local UE or the remote end. Although the local UE generates the IUT request to avoid repetition and for clarity of description in various examples of the present invention, the present invention is not limited thereto and the principle of the present invention is equally applicable to the case in which the remote end generates the IUT request. Since the remote end and the local UE exchange the media flow, it may be easily understood that the example in which the local UE requests IUT and the remote end responds to the IUT request as well as the example in which the remote end requests IUT and the local UE responds to the IUT request is possible without separate description. That is, the present invention should be understood as a method of determining whether IUT restriction is dynamically and/or individually applied via interaction between a network, to which one end of a media flow session belongs, and the other end thereof, in operation in which one end of the media flow session generates an IUT request and the other end thereof responds to the IUT request.

Embodiment 1

Embodiment 1 relates to IUT restriction operation if a source UE of a media requests IUT operation in establishment of a collaborative session according to media transfer between UEs belonging to different subscribers.

Figure 8:
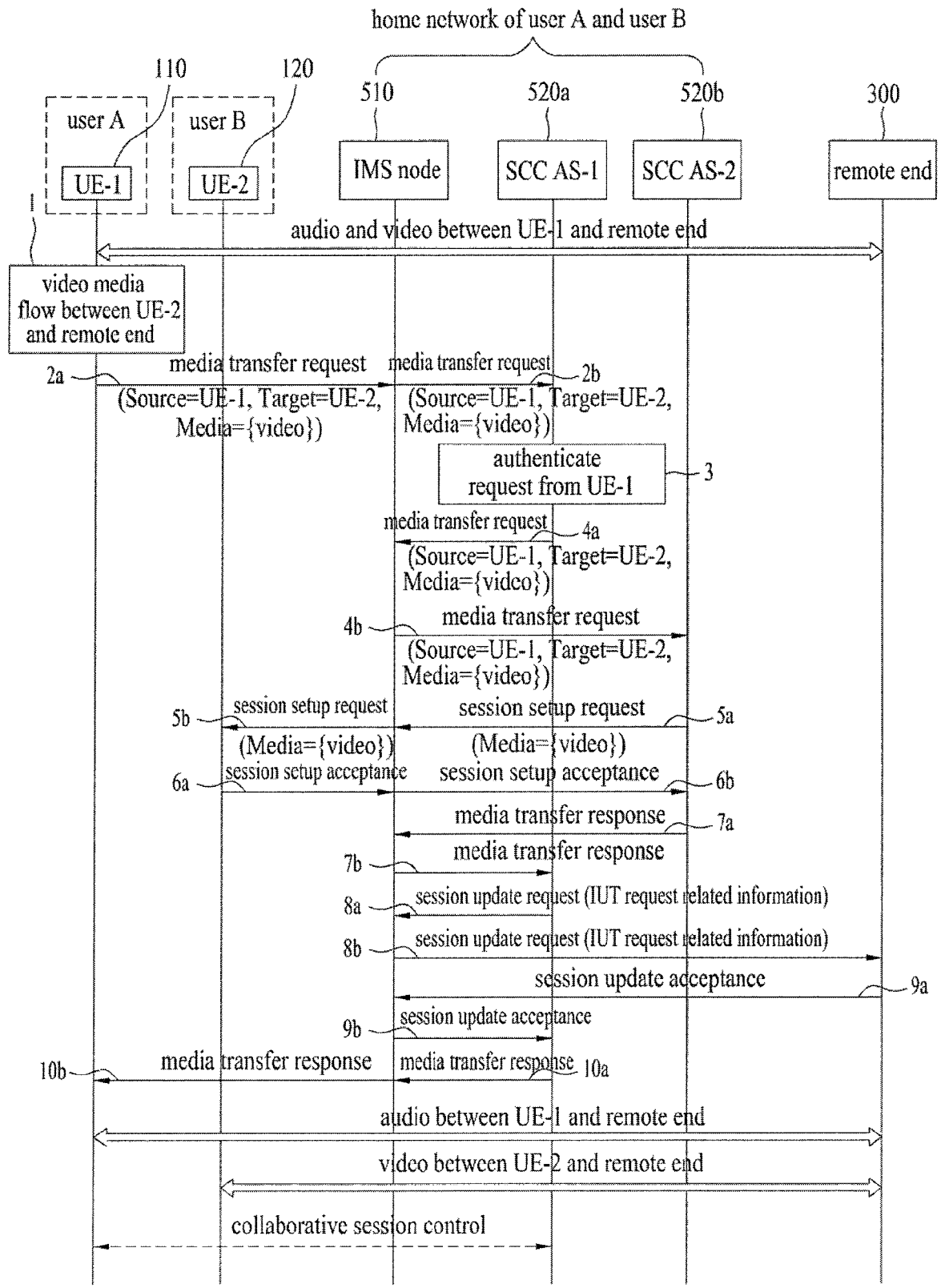
FIGS. 8 to 11 are flowcharts of IUT restriction operation in case of media transfer.
Figure 9:
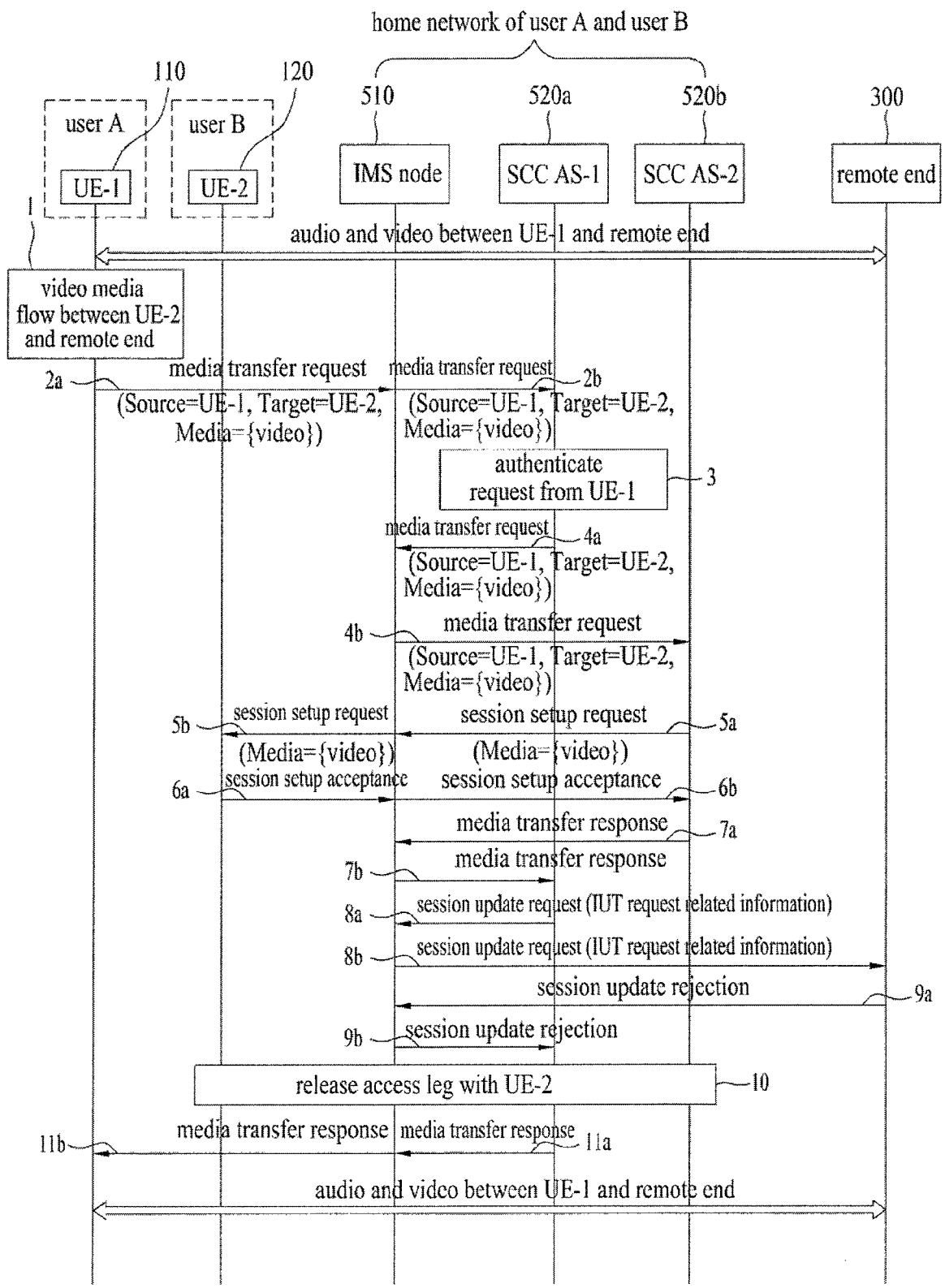

FIGS. 8 and 9 are exemplary flowcharts of IUT restriction operation in case of media transfer. In the examples of FIGS. 8 and 9, assume that a UE-1 110 belongs to a user A and a UE-2 120 belongs to a user B. In the example of FIGS. 8 and 9, a home network to which the users A and B subscribe is shown. The home network includes an IMS node, an SCC AS-1 520*a* and an SCC AS-2 520*b*. The SCC AS-1 520*a* serves the user A and the SCC AS-2 520*b* serves the user B. The IMS node 510 includes a CSCF such as a P-CSCF and an S-CSCF. The S-CSCFs which serve the user A and the user B may be the same or different.

In the examples of FIGS. 8 and 9, assume that, in a state in which the user A progresses with respect to a session including an audio media flow and a video media flow with the remote end 300 via the UE-1 110, the user A transfers the video media flow to the UE-2 120 owned by the user B (without transferring the audio media flow) while maintaining session continuity. In this case, FIG. 8 shows the case in which the IUT request of the UE-1 110 is accepted by the remote end and FIG. 9 shows the case in which the IUT request of the UE-1 110 is rejected by the remote end 300.

First, the detailed example of the present invention will be described with reference to FIG. 8.

In step 1 of FIG. 8, the UE-1 110 may decide to transfer the video media flow to the UE-2 120. At this time, control rights for the audio media flow which is not transferred to the UE-2 120 and is kept in the UE-1 110 and the video media flow to be transferred to the UE-2 120 may be maintained in the UE-1 110. Decision of step 1 may be triggered by selection, input, etc. of the user A or depending on whether a predetermined criterion set with respect to the UE-1 110 is satisfied.

In steps 2*a* and 2*b* of FIG. 8, the UE-1 110 may transmit a transfer request message (e.g., a media transfer request message) to the SCC AS-1 520*a* via the IMS node 510 in order to transfer the video media flow to the UE-2 120. The transfer request message may be an SIP based REFER message for call delivery (a message indicating contact information such as URI INFO using a Refer-To header field), for example.

In step 3 of FIG. 8, the SCC AS-1 520*a* may authenticate or verify the transfer request message from the UE-1 110. Such authentication/verification may be performed based on subscriber information. For example, authentication/verification may include determining whether IUT of the UE-1 110 is accepted. Alternatively, authentication/verification may include determining whether the media on the UE-1 110 may be transferred to the UE-2 120. Alternatively, in the example of FIG. 8, the authentication/verification process by the SCC AS-1 520*a* may not include verification for IUT restriction or may include only IUT restriction (that is, network-specific IUT restriction) defined by agreement for IUT services of network operators shown in FIG. 7 without verification for user-specific IUT restriction if verification for IUT restriction is included.

In steps 4a and 4b of FIG. 8, the SCC AS-1 520a may transfer the transfer request message to the SCC AS-2 520b via the IMS node 510.

Here, the SCC-AS 520b which has received the transfer request message from the SCC AS-1 520a may authenticate or verify the transfer request message before transmitting a session initiation request message to the UE-2 120 (not shown). Such authentication/verification may be performed based on subscriber information and a detailed description thereof is equal to the description of step 3.

In steps 5a and 5b of FIG. 8, the SCC AS-2 520b may transmit, to the UE-2 120, a session initiation (or setup) request message including information about the video media flow requested to be transferred via the IMS node 510. The session initiation request message may be an SIP based INVITE message for requesting session establishment, for example.

In steps 6a and 6b of FIG. 8, the UE-2 120 may transmit a session initiation acceptance message to the SCC AS-2 520b via the IMS node 510 in response to the session initiation request message. The session initiation acceptance message may be one (e.g., 200 OK message) of SIP response 2XX messages indicating that the session initiation request has been normally processed, for example. Accordingly, an access leg between the SCC AS-2 520b and the UE-2 120 may be set.

In steps 7a and 7b of FIG. 8, the SCC AS-2 520b may transmit a response message in response to the transfer request message to the SCC AS-1 520a.

In steps 8a and 8b of FIG. 8, the SCC AS-1 520a may transmit, to the remote end 300, a session update request message including changed items according to transfer of the video media flow via the IMS node 510. The session update request message may be an SIP based INVITE message, for example.

Steps 8a and 8b of FIG. 8 may correspond to a step of performing remote leg update from the SCC AS-1 520a which serves the UE-1 110 which is a controller UE of a collaborative session established by IUT operation of the video media flow, that is, the hosting SCC AS, to the remote end. Accordingly, when the SCC AS-1 520a transmits the session update request message to the remote end, the SCC AS-1 520a may include "IUT request related information" in order to inform the remote end that the IUT request has been received.

As described above, information (e.g., IUT request reception indication, information about attributes of IUT operation, information about the target UE of IUT operation, information about a media for IUT operation is performed, etc.) included in the IUT request related information may be specified in an SIP header or a session description protocol (SDP) message. For IUT request related information, one or more new SIP header fields, parameters of SIP header fields, SDP header fields and parameters of the SDP header fields may be defined and used. Alternatively, for IUT request related information, existing header fields or parameters of the header fields may be used. Alternatively, for IUT request related information, existing header fields or parameters of the header fields may be reused and interpreted as new meanings different from the existing meanings. Alternatively, a combination of existing headers/parameters and new headers/parameters may be used to express the IUT request related information.

In step 8b of FIG. 8, the remote end 300 (or the user of the remote end 300) which has received the session update request message may determine whether the requested session update is accepted (not shown). Acceptance of the session update by IUT may be determined based on IUT restriction set with respect to the remote end 300. For example, such a determination may be triggered by selection, input, etc. of the user or depending on whether a predetermined criterion set with respect to the remote end 300 is satisfied. Such a determination may be made by a node serving the remote end 300. In the example of FIG. 8, assume that the remote end 300 accepts the session update by IUT.

In steps 9a and 9b of FIG. 8, the remote end 300 may transmit a session update acceptance message indicating that the session update by IUT operation can be accepted with respect to the session update request including the IUT request related information transmitted by the SCC AS-1 520a. Then, the session including the video media flow may be established between the UE-2 120 and the remote end 300. The session update acceptance message may be an existing SIP based 200 OK message, a message in which information (e.g., a predetermined parameter or indicator) indicating that the IUT request can be accepted is additionally included in an existing SIP response message or an SIP response newly defined to indicate acceptance of the IUT request.

In steps 10a and 10b of FIG. 8, the SCC AS-1 520a which has received the session update acceptance message from the remote end 300 may decide to perform IUT operation requested by the UE-1 110 and then transmit, to the UE-1 110, a response message (e.g., a media transfer response message) indicating that the requested IUT operation has finished via the IMS node 510.

Steps 10a and 10b of FIG. 8 may include all operations (e.g., operation for transmitting a message for removing the transferred video media from the UE-1 110 by the SCC AS-1 520a) requested to finish IUT operation of the video media flow, in addition to transmission of the response message to the UE-1 110 in order to indicate that the requested IUT operation has finished.

For details of establishment of a collaborative session according to media transfer of FIG. 8, 3GPP TS 24.337 is incorporated by reference.

Therefore, the UE-1 110 may have control rights for a collaborative session including the audio media flow on the UE-1 110 and the video media flow on the UE-2 120 even after the video media flow has been transferred to the UE-2 120. That is, the UE-1 110 may be a controller UE and the UE-2 110 may be a controlled UE. In addition, the hosting SCC AS for the established collaborative session may be the SCC AS-1 520a which serves the UE-1 110, which is the controller UE.

Next, a detailed example of the present invention will be described with reference to FIG. 9.

In the example of FIG. 9, assume that the remote end 300 (or the user of the remote end 300), which has received the session update request message, rejects session update by IUT based on IUT restriction.

Steps 1 to 8b of FIG. 9 are equal to steps 1 to 8b of FIG. 8 and a description thereof will be omitted.

In steps 9a and 9b of FIG. 9, the remote end 300, which has received the session update request message, may transmit a session update rejection message to the SCC AS-1 520a via the IMS node 510. The session update rejection message may be one of existing SIP based response 4xx messages indicating that the session update request has not been normally processed, a message in which information indicating that the IUT request cannot be accepted is additionally included in an existing SIP response message (e.g., a predetermined parameter or indicator) or an SIP response message newly defined to indicate that the IUT request has been rejected.

In step 10 of FIG. 9, the SCC AS-1 520a, which has received the session update rejection message from the remote end 300, may decide not to perform IUT operation requested by the UE-1 110. Then, the SCC AS-1 520a may release the access leg for the video media on the UE-2 120 generated via steps 4a to 7b.

In steps 11a and 11b of FIG. 9, the SCC AS-1 520a may transmit, to the UE-1 110, a response message (e.g., a media transfer response message) informing the UE-1 110 that the transfer request has been rejected via the IMS node 510. The response message may be a message, in which a detailed reason why the transfer request has been rejected is additionally included in an existing response message, or a message newly defined for this purpose.

Steps 11a and 11b of FIG. 9 may include all operations for recovering operations, which were performed by the SCC AS-1 520a with respect to the UE-1 110 in order to transfer the video media flow, to original states (not shown), in addition to transmission of the response message in order to inform the UE-1 110 that the transfer request has been rejected.

Even after the IUT request has been rejected, the existing session including the audio media flow and the video media flow between the UE-1 110 and the remote end 300 may be maintained.

In the example of FIGS. 8 and 9, if the IUT request for transferring the media to the UE-2 120 is present, the access leg for the UE-2 120 is preferentially set without waiting until the remote end accepts IUT and then is released if IUT is rejected. Accordingly, if the remote end accepts IUT, IUT may be stably finished via the access leg for the UE-2 120.

Embodiment 2

Embodiment 2 relates to IUT restriction operation when the source UE of the media requests IUT operation in establishment of the collaborative session according to media transfer between UEs belonging to different subscribers.

Figure 10:
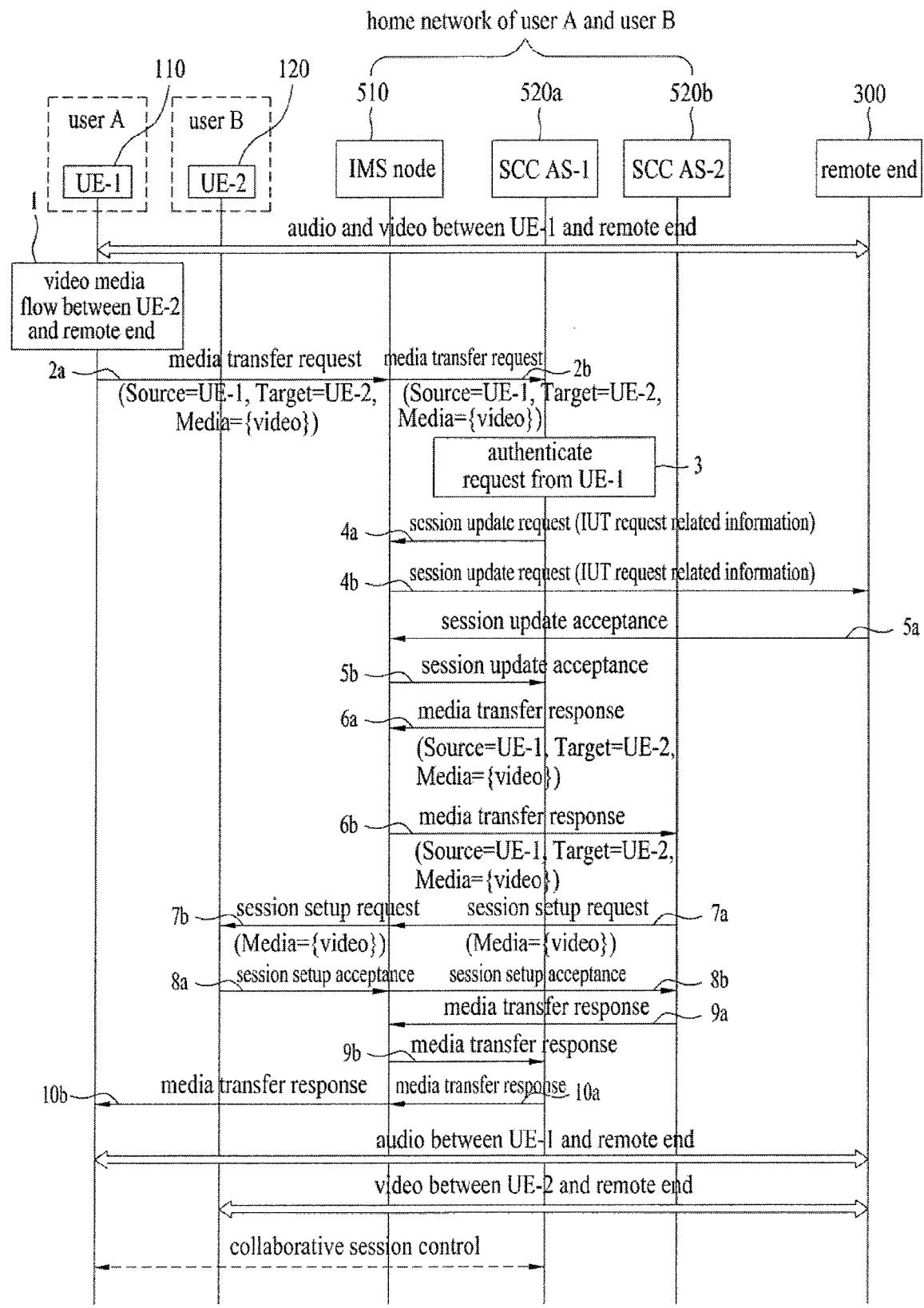
Figure 11:
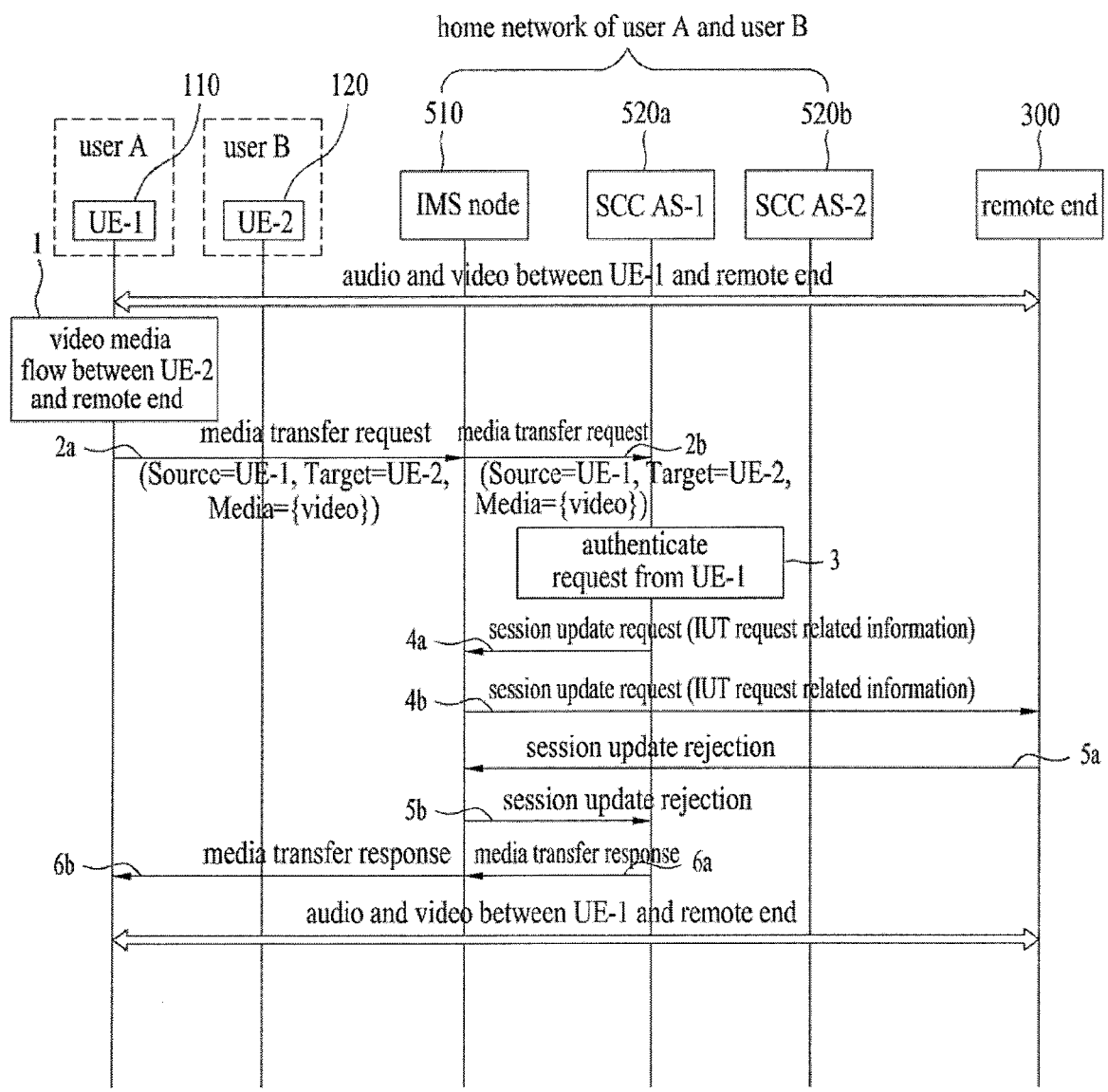

FIGS. 10 and 11 are flowcharts of IUT restriction operation in case of media transfer.

In FIG. 10, a description of the same portions as FIG. 8 will be omitted and only a difference between FIG. 10 and FIG. 8 will be described. In the following description, the steps of FIG. 10 correspond to the steps of FIG. 8 except for a difference in order of steps and thus the description of the steps of FIG. 8 is applicable to the steps of FIG. 10 unless stated otherwise.

Steps 1 to 3 of FIG. 10 are equal to steps 1 to 3 of FIG. 8.

In steps 4a and 4b of FIG. 10, the SCC AS-1 520a which is the hosting SCC AS may transmit the session update request message including the IUT request related information to the remote end 300 via the IMS node 510 in order to update the remote leg. In step 4a, another message (an existing message or a newly defined message) including the IUT request related information may be used instead of the session update request message. In step 4b, the remote end 300 (or the user of the remote end 300), which has received the session update request message, may determine whether session update by IUT is accepted (not shown). In the example of FIG. 10, assume that session update by IUT is accepted.

In steps 5a and 5b of FIG. 10, the remote end 300 may transmit the session update acceptance message to the SCC AS-1 520a via the IMS node 510. If another message (an existing message or a newly defined message) including the IUT request related information is used instead of the session update request message in step 4a, another message (an existing message or a newly defined message) indicating IUT request acceptance may be used instead of the session update acceptance message in step 5a.

In steps 6a and 6b of FIG. 10, the SCC AS-1 520a, which has received the session update acceptance message from the remote end 300, may transmit the transfer request message to the SC AS-2 520b via the IMS node 510. In addition, the SCC AS-2 520b, which has received the transfer request message from the SCC AS-1 520a, may authenticate or verify the transfer request message before transmitting the session initiation request message to the UE-2 120 (not shown).

In steps 7a and 7b of FIG. 10, the SCC AS-2 520b may transmit, to the UE-2 120, the session initiation (or setup) request message including information about the video media flow requested to be transferred via the IMS node 510, based on the transfer request message.

In steps 8a and 8b of FIG. 10, the UE-1 120 may transmit an acceptance message to the SCC AS-2 520b via the IMS node 510 in response to the session initiation request message.

In steps 9a and 9b of FIG. 10, the SCC AS-2 520b may transmit a message in response to the transfer request message to the SCC AS-1 520a via the IMS node 510.

In steps 10a and 10b of FIG. 10, the SCC AS-1 520a, which has received the transfer response message from the SCC AS-2 520b, may transmit the response message indicating that the requested transfer operation has finished to the UE-1 110 via the IMS node 510.

After step 9b, the SCC AS-1 520a may perform additional interaction with the remote end 300 in order to finish IUT of the video media flow.

Thus, the collaborative session including the audio media flow between the UE-1 110 and the remote end 300 and the video media flow between the UE-2 120 and the remote end 300 may be established.

Next, in FIG. 11, a description of the same portions as FIG. 10 will be omitted and only a difference between FIG. 11 and FIG. 10 will be described.

In the example of FIG. 11, assume that the remote end 300 (or the user of the remote end 300) which has received the session update request message rejects session update by IUT based on IUT restriction.

Steps 1 to 4b of FIG. 11 are equal to steps 1 to 4b of FIG. 10.

In steps 5a and 5b of FIG. 11, the remote end 300, which has received the session update request message, may transmit the session update rejection message to the SCC AS-1 520a via the IMS node 510. Similarly to FIG. 10, in step 4a of FIG. 11, another message (an existing message or a newly defined message) including the IUT request related information may be used instead of the session update request message. In this case, in step 5a, another message (an existing message or a newly defined message) indicating IUT request acceptance may be used instead of the session update acceptance message.

In steps 6a and 6b of FIG. 11, the SCC AS-1 520a may transmit, to the UE-1 110, a response message indicating that the transfer request has been rejected via the IMS node 510.

In FIG. 11, if the IUT request is rejected by the remote end 300, the procedure related to session initiation of the UE-2 120 is not performed.

In the examples of FIGS. 10 and 11, if the IUT request for transferring the media to the UE-2 120 is present, the access leg for the UE-2 120 is not immediately set but a determination as to whether the access leg for the UE-2 120 is set is made depending on the remote end accepts/rejects IUT in consideration of IUT restriction. Accordingly, if the remote end rejects IUT, unnecessary setting and then release of the access leg may be prevented.

Embodiment 3

Embodiment 3 relates to IUT restriction operation if the target UE of the media requests IUT operation in establishment of the collaborative session according to media replication between UEs belonging to different subscribers.

Figure 12:
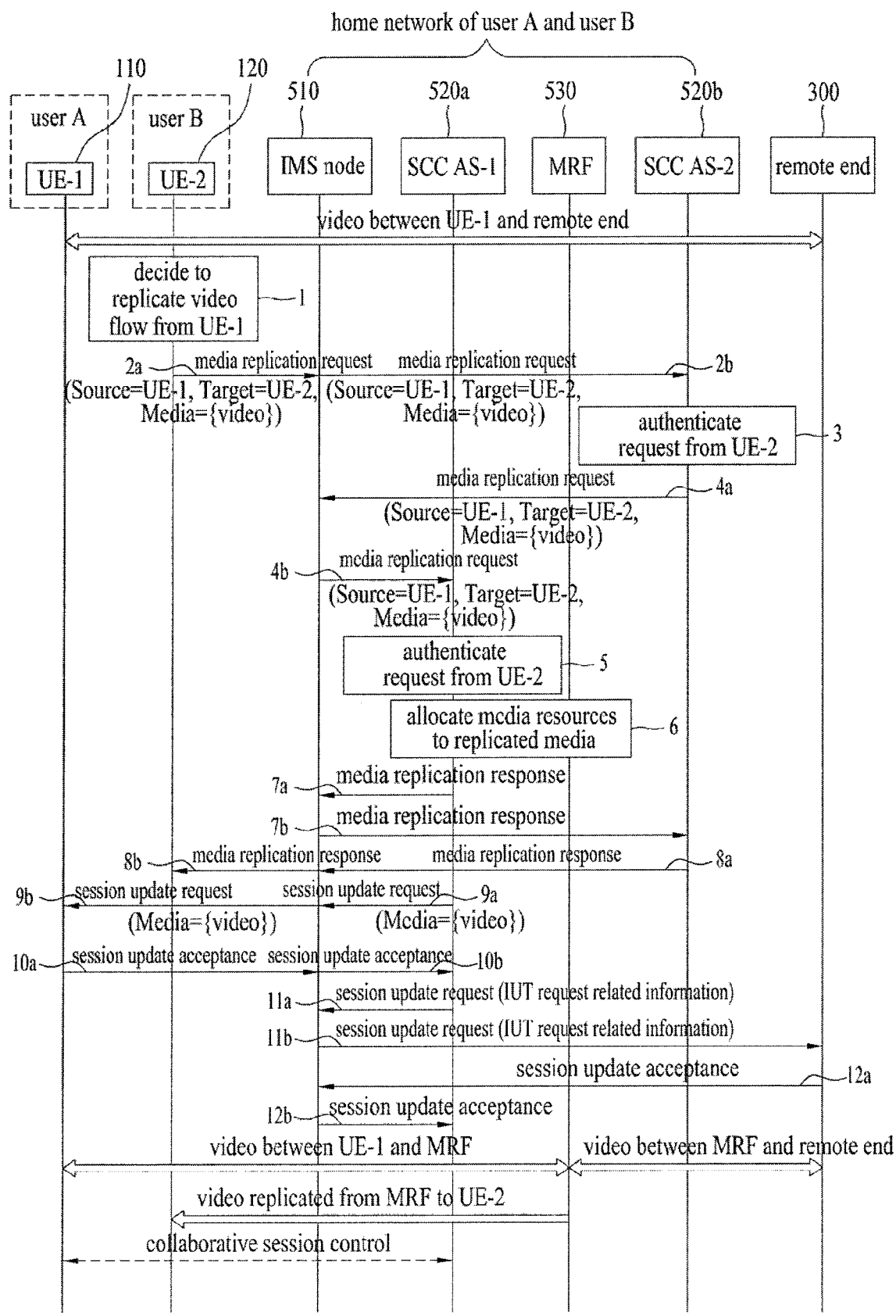
FIGS. 12 to 15 are flowcharts of IUT restriction operation in case of media replication.
Figure 13:
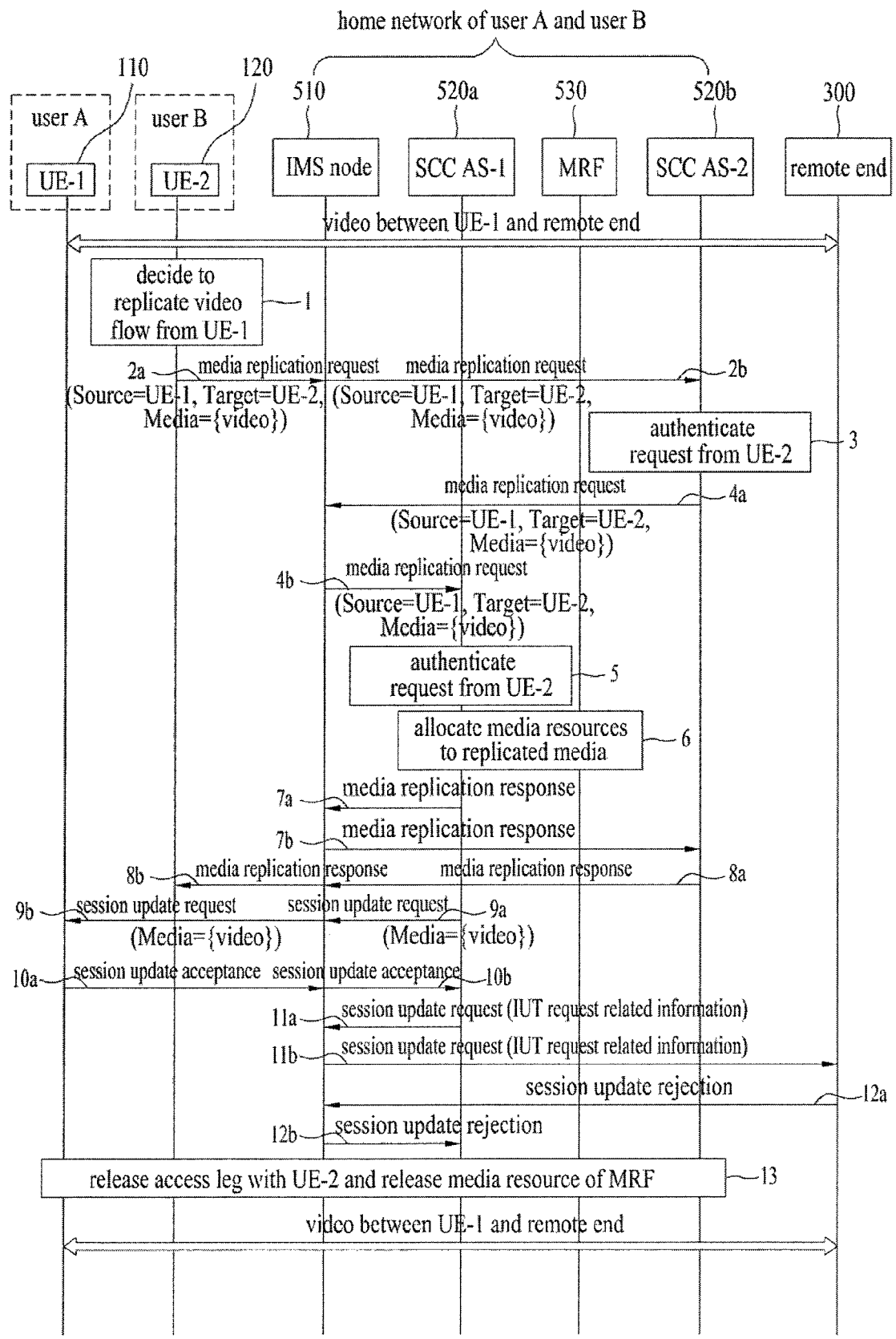

FIGS. 12 and 13 are flowcharts of IUT restriction operation in case of media replication. In the examples of FIGS. 12 and 13, assume that the UE-1 110 belongs to a user A and the UE-2 120 belongs to a user B. In the examples of FIGS. 12 and 13, a home network to which the users A and B subscribe is shown. The home network includes the IMS node 510, the SCC AS-1 520a, the SCC AS-2 520b and the MRF 530. The SCC AS-1 520a serves the user A and the SCC AS-2 520b serves the user B. The IMS node 510 includes a CSCF such as a P-CSCF and an S-CSCF. The S-CSCF which serves the user A and the user B may be the same or different.

In FIGS. 12 and 13, in a state in which the user A progresses with respect to the session including the video media flow with the remote end 300 via the UE-1 110, the user B may request the IMS network to replicate the video media flow on the UE-1 110 owned by the user A to the UE-2 120. A collaborative session in which the UE-1 110 and the UE-2 120 participate may be established due to replication of the video media flow by the IMS network. In FIGS. 12 and 13, replication of the video media flow may be interpreted as replication of the session including the video media flow. FIG. 12 shows the case in which the IUT request of the UE-2 120 is accepted by the remote end 300 and FIG. 13 shows the case in which the IUT request of the UE-2 120 is rejected by the remote end 300.

First, a detailed example of the present invention will be described.

In step 1 of FIG. 12, the video media flow of the UE-1 110 may be decided to be replicated to the UE-2 120. At this time, the UE-1 110 may have control rights for the collaborative session established according to media replication. Decision of step 1 may be triggered by selection, input, etc. of the user B or depending on whether a predetermined criterion set with respect to the UE-2 120 is satisfied.

In steps 2a and 2b of FIG. 12, the UE-2 120 may transmit a replication request message (e.g., a media replication request message) to the SCC AS-2 520b via the IMS node 510 in order to replicate the video media flow from the UE-1 110. The replication request message may be an SIP based INVITE message, for example.

In step 3 of FIG. 12, the SCC AS-2 520b may authenticate or verify the replication request message from the UE-2 120. Such authentication/verification may be performed based on subscriber information. For example, authentication/verification may include determining whether IUT of the UE-2 120 is accepted. Alternatively, authentication/verification may include determining whether the media on the UE-1 110 may be replicated to the UE-2 120. Alternatively, in the example of FIG. 12, the authentication/verification process by the SCC AS-2 520b may not include verification for IUT restriction or may include only network-specific IUT restriction without verification for user-specific IUT restriction if verification for IUT restriction is included.

In steps 4a and 4b of FIG. 12, the SCC AS-2 520b may transfer the replication request message to the SCC AS-1 520a via the IMS node 510.

In step 5 of FIG. 12, the SCC AS-1 520a may authenticate or verify the replication request message from the UE-2 120. Such authentication/verification may be performed based on subscriber information and a detailed description thereof is equal to the description of step 3.

In step 6 of FIG. 12, the SCC AS-1 520a may perform a resource allocation process for the replicated video media flow with the MRF 530 based on the replication request message. For example, the resource allocation process may include allocation of media port numbers necessary for the MRF 530 to configure a user plane with the UE-1 110 and the UE-2 120.

In steps 7a and 7b of FIG. 12, the SCC AS-1 520a, which has finished resource allocation for the replicated video media flow with the MRF 530, may transmit a response message (e.g., a media replication response message) in response to the replication request message to the SCC AS-2 520b via the IMS node 510.

In steps 8a and 8b of FIG. 12, the SCC AS-2 520b may transmit, to the UE-2 120, the response message in response to the replication request message received in step 2b via the IMS node 510. Then, the access leg between the SCC AS-2 520b and UE-1 120 may be set.

In steps 9a and 9b of FIG. 12, the SCC AS-1 520a may transmit, to the UE-1 110, a session update request message for requesting the remote end 300 to change a communication counterpart for the video media flow to the MRF 530 via the IMS node 510. The session update request message may be an SIP based INVITE message, for example.

In steps 10a and 10b of FIG. 12, the UE-1 110 may transmit an acceptance message (e.g., a session update acceptance message) to the SCC AS-1 520a via the IMS node 510 in response to the session update request message. The session update acceptance message may be an SIP based 200 OK message, for example.

In steps 11a and 11b of FIG. 12, the SCC AS-1 520a may transmit a session update request message including changed items according to replication of the video media flow to the remote end 300 via the IMS node 510. The session update request message may be an SIP based INVITE message, for example.

Steps 11a and 11b of FIG. 12 may correspond to a step of updating the remote leg with the remote end by the SCC AS-1 520a which serves the controller UE of the collaborative session established by IUT operation of the video media flow, that is, the hosting SCC AS. Accordingly, when the SCC AS-1 520a transmits the session update request message to the remote end, "IUT request related information" may be included in order to inform the remote end that the SCC AS-1 520a has received the IUT request.

As described above, information (e.g., IUT request reception indication, information about attributes of IUT operation, information about the target UE of IUT operation, information about a media for which IUT operation is performed, etc.) included in the IUT request related information may be specified in an SIP header or a session description protocol (SDP) message. For IUT request related information, one or more new SIP header fields, parameters of SIP header fields, SDP header fields and parameters of the SDP header fields may be defined and used. Alternatively, for IUT request related information, existing header fields or parameters of the header fields may be used. Alternatively, for IUT request related information, existing header fields or parameters of the header fields may be reused and interpreted as new meanings different from the existing meanings. Alternatively, a combination of existing headers/parameters and new headers/parameters may be used to express the IUT request related information.

In step 11b of FIG. 12, the remote end 300 (or the user of the remote end 300), which has received the session update request message, may determine whether the requested session update is accepted (not shown). Acceptance of the session update by IUT may be determined based on IUT restriction set with respect to the remote end 300. For example, such determination may be triggered by selection, input, etc. of the user of the remote end 300 or depending on whether a predetermined criterion set with respect to the remote end 300 is satisfied. Such a determination may be made by a node serving the remote end 300. In the example of FIG. 12, assume that the remote end accepts the session update by IUT.

In steps 12a and 12b of FIG. 12, the remote end 300 may transmit a session update acceptance message indicating that the session update by IUT operation can be accepted, with respect to the session update request including the IUT request related information, which is transmitted by the SCC AS-1 520a. The session update acceptance message may be an existing SIP based 200 OK message, a message, in which information (e.g., a predetermined parameter or indicator) indicating that the IUT request can be accepted is additionally included in an existing SIP response message, or an SIP response newly defined to indicate acceptance of the IUT request.

In step 12b of FIG. 12, the SCC AS-1 520a which has received the session update acceptance message from the remote end 300 may decide to perform IUT operation requested by the UE-2 120. Such decision may include the SCC AS-1 520a transmitting an ACK message (e.g., an SIP based ACK message) to the remote end 300 (not shown) in response to the session update acceptance message.

For details of establishment of a collaborative session according to media transfer of FIG. 12, 3GPP TS 24.337 is incorporated by reference.

After steps 12a and 12b of FIG. 12, the video media flow between the UE-1 110 and the MRF 530 may be generated and the video media flow from the MRF 530 to the UE-2 120 may be generated. In addition, the session including the video media session may be established between the MRF 530 and the remote end 300. That is, the video media flow generated between the MRF 530 and the remote end 300 by the MRF 530 for controlling the media streaming function may be understood to be simultaneously provided to the UE-1 110 and the UE-2 120.

In the example of the above-described media replication operation, a collaborative session in which the UE-1 110 is a controller UE and the UE-2 120 is a controlled UE may be established. In this case, the hosting SCC AS for the established collaborative session is the SCC AS-1 520a which serves the UE-1 110, which is the controller UE.

Next, a detailed example of the present invention will be described with reference to FIG. 13.

In the example of FIG. 13, assume that the remote end 300 (or the user of the remote end 300), which has received the session update request message, rejects session update by IUT based on IUT restriction.

Steps 1 to 11b of FIG. 13 are equal to steps 1 to 11b of FIG. 12 and a description thereof will be omitted.

In steps 12a and 12b of FIG. 13, the remote end 300, which has received the session update request message, may transmit a session update rejection message to the SCC AS-1 520a via the IMS node 510. The session update rejection message may be one of existing SIP based response 4xx messages indicating that the session update request has not been normally processed, a message, in which information indicating that the IUT request cannot be accepted is additionally included in an existing SIP response message (e.g., a predetermined parameter or indicator), or an SIP response message newly defined to indicate that the IUT request has been rejected.

In step 13 of FIG. 13, the SCC AS-1 520a, which has received the session update rejection message from the remote end 300, may decide not to perform IUT operation requested by the UE-1 110. Then, the SCC AS-1 520a may release the access leg for the video media flow on the UE-2 120 generated via steps 2a to 8b and also release resources allocated by the MRF. Additionally, step 13 may include all operations for recovering operations, which were performed by the SCC AS-1 520a in the previous steps with respect to the UE-1 110, to original states in order to replicate the video media flow (not shown).

Even after the IUT request has been rejected, the existing session including the video media flow between the UE-1 110 and the remote end 300 may be maintained.

In the example of FIGS. 12 and 13, if the IUT request for replicating the media to the UE-2 120 is present, the access leg for the UE-2 120 is preferentially set without waiting until the remote end accepts IUT, resource allocation is performed by the MRF 530, and then the set access leg and the media resources of the MRF 530 are released if IUT is rejected. Accordingly, if the remote end accepts IUT, IUT may be stably finished via the access leg for the UE-2 120 and the allocated media resources.

Embodiment 4

Embodiment 4 relates to IUT restriction operation when the target UE of the media requests IUT operation in establishment of the collaborative session according to media replication between UEs belonging to different subscribers.

Figure 14:
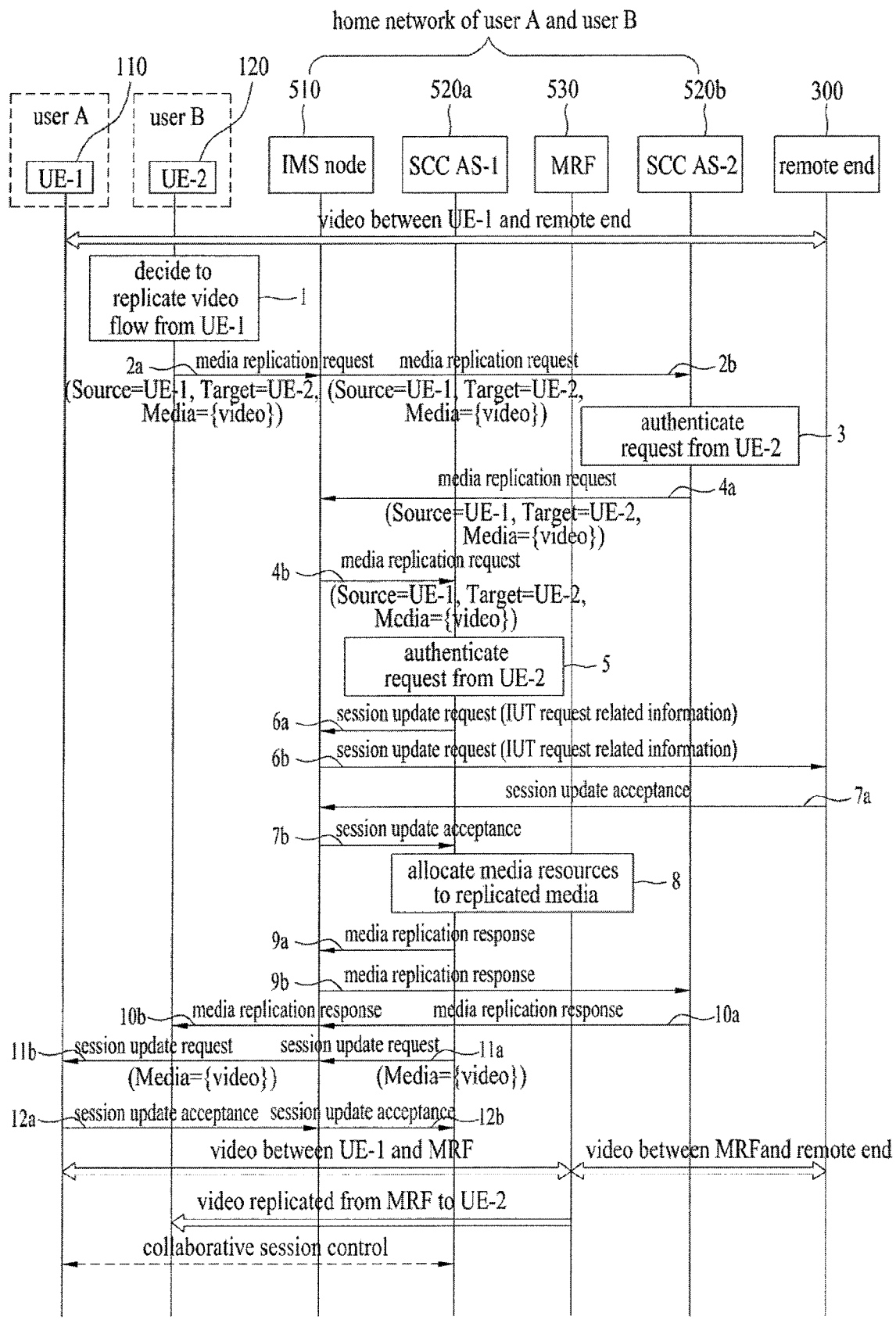
Figure 15:
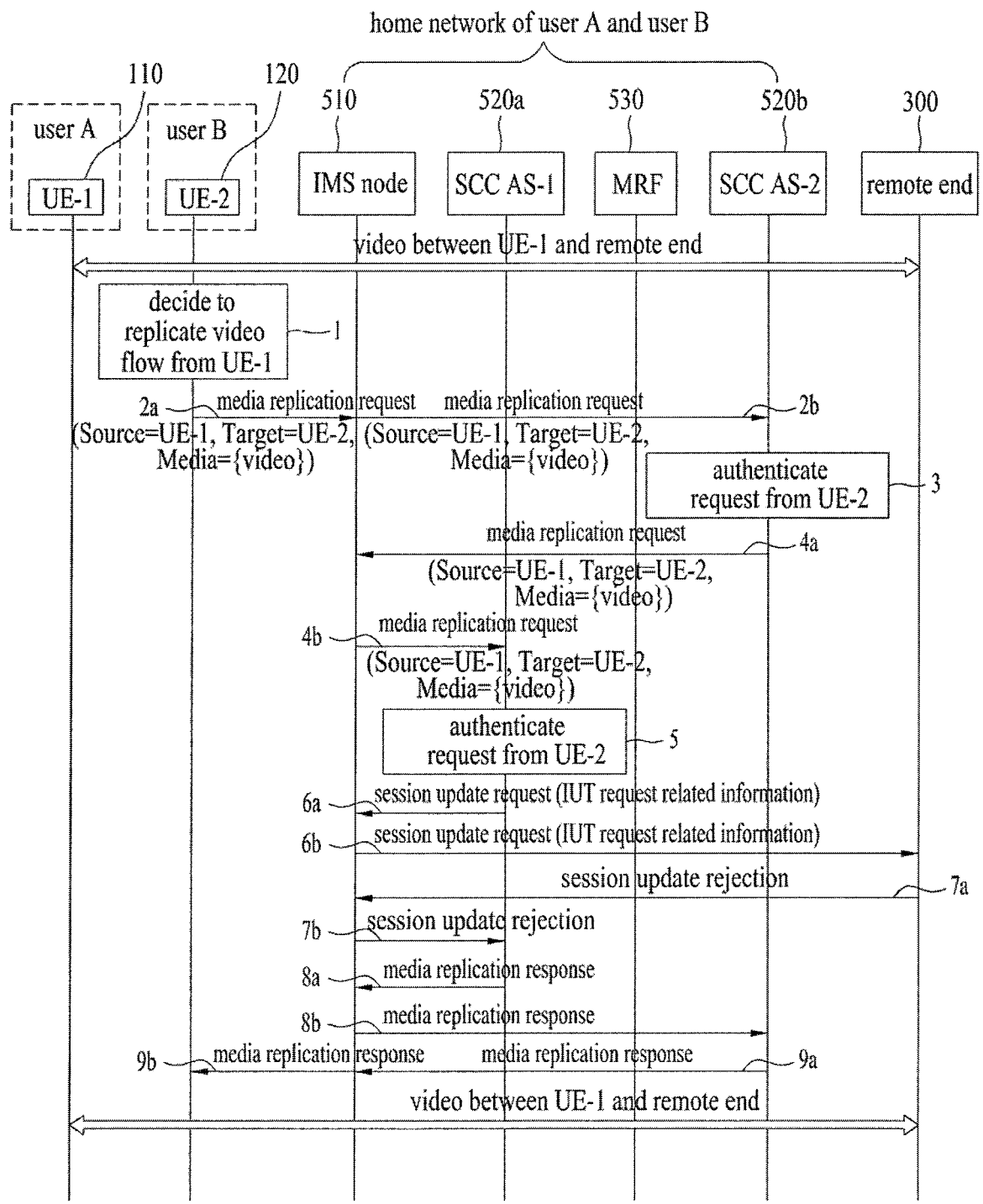

FIGS. 14 and 15 are flowcharts of IUT restriction operation in case of media replication.

In FIG. 14, a description of the same portions as FIG. 12 will be omitted and only a difference between FIG. 12 and FIG. 14 will be described. In the following description, the steps of FIG. 14 correspond to the steps of FIG. 12 except for a difference in order of steps and thus the description of the steps of FIG. 12 is applicable to the steps of FIG. 14 unless stated otherwise.

Steps 1 to 5 of FIG. 14 are equal to steps 1 to 5 of FIG. 12.

In steps 6a and 6b of FIG. 14, the SCC AS-1 520a may transmit the session update request message including the changed items according to replication of the video media flow to the remote end 300 via the IMS node 510. In these steps, the hosting SCC AS-1 520a performs remote leg update to the remote end 300 and the session update request message may include "IUT request related information". The IUT request related information and the session update request message including the same are equal to those described in the above-described embodiments and thus a detailed description thereof will be omitted. In step 6a, another message (an existing message or a newly defined message) including the IUT request related information may be used instead of the session update request message.

In steps 7a and 7b of FIG. 14, the remote end 300 may transmit the session update acceptance message indicating that session update by IUT operation can be accepted, in response to the session update request including the IUT request related information transmitted by the SCC AS-1 520a. If another message (an existing message or a newly defined message) including the IUT request related information is used instead of the session update request message in step 6a, another message (an existing message or a newly defined message) indicating IUT request acceptance may be used instead of the session update acceptance message in step 7a.

In step 7b of FIG. 14, the SCC AS-1 520a, which has received the session update acceptance message from the remote end 300, may perform the resource allocation process for the replicated video media flow with the MRF 530 in step 8.

In steps 9a and 9b of FIG. 14, the SCC AS-1 520a, which has finished resource allocation for the replicated video media flow with the MRF 530, may transmit a response message (e.g., a media replication response message) in response to the replication request message to the SCC AS-2 520b via the IMS node 510.

In steps 10a and 10b of FIG. 14, the SCC AS-2 520b may transmit the response message in response to the replication request message received in step 2b to the UE-2 120 via the IMS node 510. Thus, the access leg between the SCC AS-2 520b and the UE-2 120 may be set.

In steps 11 and 11b of FIG. 14, the SCC AS-1 520a may transmit, to the UE-1 110, a session update request message for requesting change of the communication counterpart of the video media flow from the remote end 300 to the MRF 530 via the IMS node 510. The session update request message may be an SIP based INVITE message, for example.

In steps 12a and 12b of FIG. 14, the UE-1 110 may transmit an acceptance message (e.g., a session update acceptance message) in response to the session update request message to the SCC AS-1 520a via the IMS node 510. The session update acceptance message may be an SIP based 200 OK message, for example.

After step 12b, the SCC AS-1 520a may perform additional interaction with the remote end 300 in order to finish IUT of the video media flow.

Thus, the video media flow between the UE-1 110 and the MRF 530 may be generated and the video media flow between the MRF 530 and the UE-2 120 may be generated. In addition, the session including the video media flow between the MRF 530 and the remote end 300 may be established. Thus, the collaborative session in which the UE-1 110 is a controller UE and the UE-2 120 is a controlled UE may be established. In this case, the hosting SCC AS for the established collaborative session is the SCC AS-1 520a which serves the UE-1 110, which is the controller UE.

Next, in FIG. 15, a description of the same portions as FIG. 14 will be omitted and only a difference between FIG. 14 and FIG. 15 will be described.

In the example of FIG. 15, assume that the remote end 300 (or the user of the remote end 300), which has received the session update request message, rejects session update by IUT based on IUT restriction.

Steps 1 to 6b of FIG. 15 are equal to steps 1 to 6b of FIG. 14.

In steps 7a and 7b of FIG. 15, the remote end 300, which has received the session update request message, transmits a session update rejection message to the SCC AS-1 520a via the IMS node 510. Similarly to FIG. 14, in step 6a of FIG. 15, another message (an existing message or a newly defined message) including the IUT request related information may be used instead of the session update request message. In this case, in step 7a, another message (an existing message or a newly defined message) indicating IUT request acceptance may be used instead of the session update acceptance message.

In steps 8a and 8b of FIG. 15, the SCC AS-1 520a may transmit, to the SCC AS-2 520b, a response message indicating that the media replication request has been rejected via the IMS node 510.

In steps 9a and 9b of FIG. 15, the SCC AS-2 520b may transmit, to the UE-2 120, the response message indicating that the media replication request has been rejected, which is received from the SCC AS-1 520a, via the IMS 510.

In FIG. 15, if the IUT request is rejected by the remote end 300, the procedure related to session initiation of the UE-2 120 is not performed and resource allocation for media replication by the MRF 530 is also not performed.

In the examples of FIGS. 14 and 15, if the IUT request for replicating the media to the UE-2 120 is present, setting of the access leg for the UE-2 120 and media resource allocation by the MRF 530 are not immediately performed but a determination as to whether the access leg for the UE-2 120 is set and resource allocation is performed by the MRF 530 is made depending on whether the remote end accepts/rejects IUT in consideration of IUT restriction. Accordingly, if the remote end rejects IUT, unnecessary setting and then release of the access leg and allocation and release of the media resources by the MRF may be prevented.

Although the UE-1 110 and the UE-2 120 belong to different IMS subscriptions in Embodiments 1 to 4, the present invention is not limited thereto and the principle of the present invention is equally applicable to the case in which the UE-1 110 and the UE-2 120 belong to the same IMS subscription (e.g., both the UE-1 110 and the UE-2 120 belong to one subscriber) and/or are served by the same SCC AS.

Embodiment 5

Embodiment 5 relates to an example of applying IUT restriction operation if a user side is a session originating point, a remote end is a session terminating point and a collaborative session is established between UEs belonging to the same subscriber when the user side initiates the session. That is, Embodiment 5 relates to various methods for applying IUT restriction if a collaborative session is initiated in a state in which a session is not established, unlike the case in which a collaborative session is initiated according to IUT operation in a state in which a normal session is already established.

Figure 16:
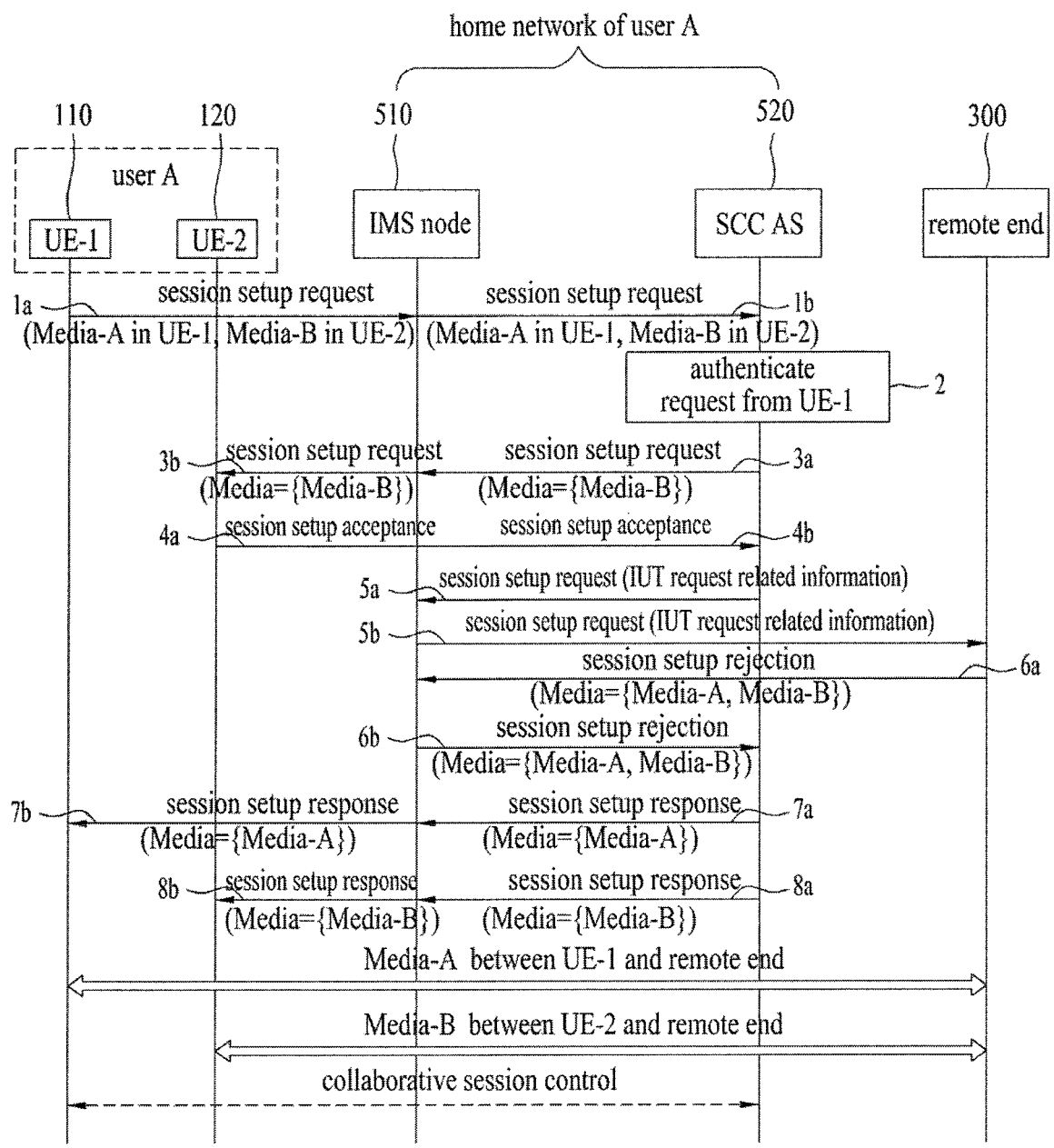
FIGS. 16 to 21 are flowcharts illustrating an example of applying IUT restriction operation in case of a session creation request including IUT.
Figure 17:
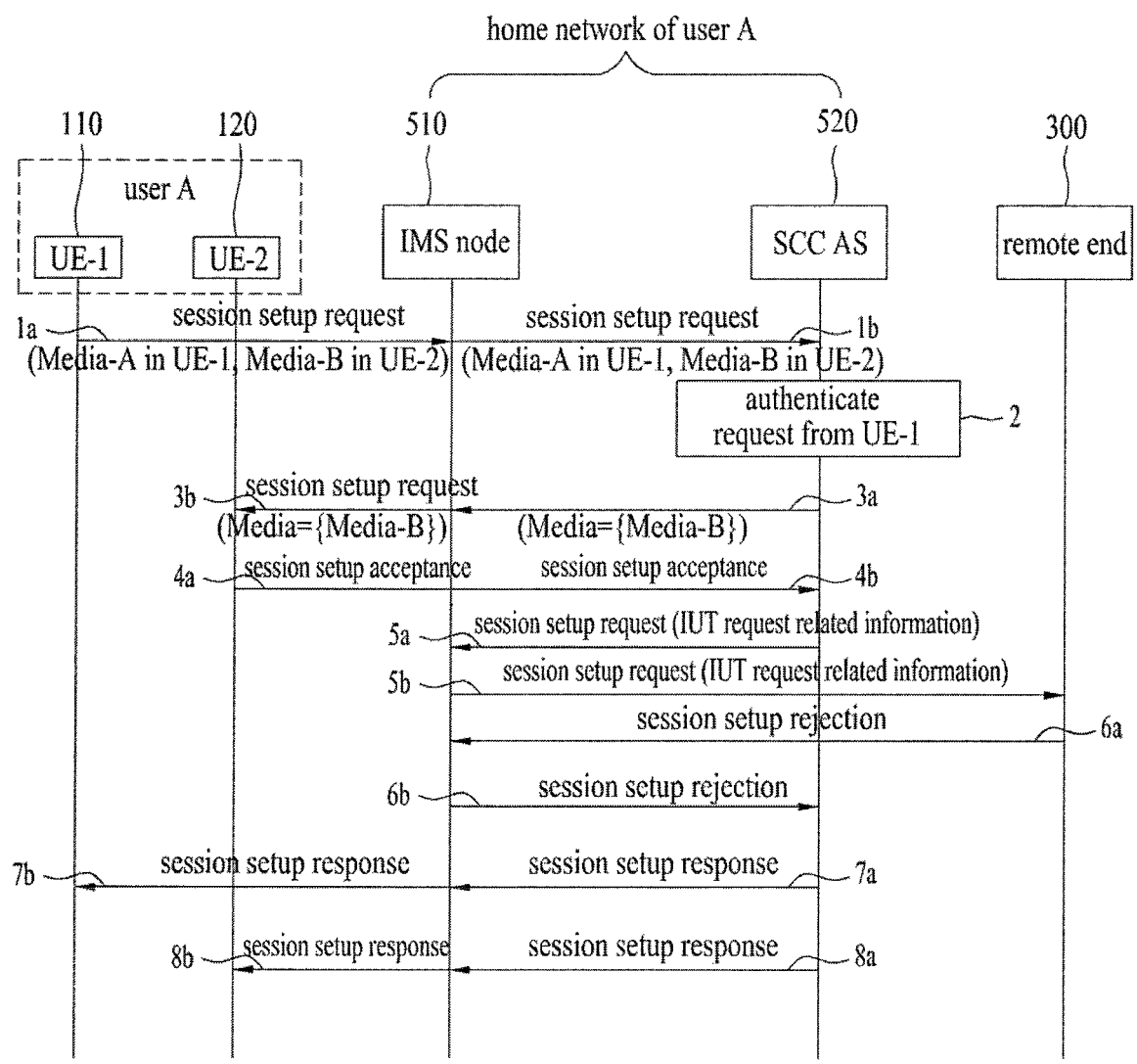

FIGS. 16 and 17 are flowcharts illustrating examples of applying IUT restriction operation if a session (that is, a collaborative session) in which a plurality of UEs participate is initiated. In the examples of FIGS. 16 and 17, assume that both the UE-1 110 and the UE-2 120 belong to a user A. In the examples of FIGS. 16 and 17, a home network to which the user A subscribes is shown. The home network includes an IMS node 510 and an SCC AS 520. Here, the IMS node 510 includes a CSCF such as a P-CSCF and an S-CSCF.

In FIGS. 16 and 17, assume that the user A initiates a session including Media-A and Media-B with the remote end 300. At this time, Media-A is connected to the UE-1 110 and Media-B is connected to the UE-2 120. Then, the user A may initiate the collaborative session between the UE-1 110 having Media-A flow and the UE-2 120 having Media-B flow and the controller UE of the collaborative session may initiate the session of the UE-1 110. FIG. 16 shows the case in which the collaborative session initiation request of the user A is accepted by the remote end 300 and FIG. 17 shows the case in which the collaborative session initiation request of the user A is rejected by the remote end 300.

First, a detailed example of the present invention will be described with reference to FIG. 16.

In steps 1*a* and 1*b* of FIG. 16, the UE-1 110 may transmit a session initiation request message (e.g., a session setup request message) to the SCC AS 520 via the IMS node 510 in order to initiate the session having Media-A and Media-B in the UE-1 110 and the UE-2 120 with the remote end 200. The session initiation request message may be an SIP based INVITE message, for example. At this time, the UE-1 110 has control rights for the collaborative session between the UE-1 110 and the UE-2 120 established by session initiation.

In step 2 of FIG. 16, the SCC AS 520 may authenticate or verify the session initiation request message from the UE-1 110. Such authentication/verification may be performed based on subscriber information. For example, authentication/verification may include determining whether IUT of the UE-2 120 is accepted. Alternatively, authentication/verification may include determining whether the media on the UE-1 110 may be replicated to the UE-2 120. Alternatively, in the example of FIG. 12, the authentication/verification process by the SCC AS-2 520*b* may not include verification for IUT restriction or may include only network-specific IUT restriction without verification for user-specific IUT restriction if verification for IUT restriction is included.

In steps 3*a* and 3*b* of FIG. 16, the SCC AS 520 may transmit the session initiation request message (e.g., the session setup request message) including information Media-B to the UE-2 120 via the IMS node 510, based on the session initiation request message received in step 1*b*.

In steps 4*a* and 4*b* of FIG. 16, the UE-2 120 may transmit an acceptance message (e.g., a session setup acceptance message) in response to the session initiation request message received in step 3*b* to the SCC AS 520 via the IMS node 510. The session initiation acceptance message may be an SIP based 200 OK message, for example.

In steps 5*a* and 5*b* of FIG. 16, the SCC AS 520 may transmit the session initiation request message (e.g., the session setup request message) including information about Media-A and Media-B to the remote end 300 via the IMS node 510. The session initiation request message may be an SIP INVITE message, for example.

Steps 5*a* and 5*b* of FIG. 16 may correspond to a step of performing session initiation operation with the remote end by the SCC AS 520 serving the UE-1 110 which is the controller UE of the collaborative session initiated simultaneously with session initiation, that is, the hosting SCC AS. Accordingly, when the SCC AS 520 transmits the session initiation request message to the remote end, "IUT request related information" may be included in order to inform the remote end of the session initiation request including the IUT request.

As described above, information (e.g., IUT request reception indication, information about attributes of IUT operation, information about the target UE of IUT operation, information about a media for IUT operation is performed, etc.) included in the IUT request related information may be specified in an SIP header or a session description protocol (SDP) message. For IUT request related information, one or more new SIP header fields, parameters of SIP header fields, SDP header fields and parameters of the SDP header fields may be defined and used. Alternatively, for IUT request related information, existing header fields or parameters of the header fields may be used. Alternatively, for IUT request related information, existing header fields or parameters of the header fields may be reused and interpreted as new meanings different from the existing meanings. Alternatively, a combination of existing headers/parameters and new headers/parameters may be used to express the IUT request related information.

In step 5*b* of FIG. 16, the remote end 300 (or the user of the remote end 300), which has received the session initiation request message, may determine whether the requested session initiation is accepted (not shown). Acceptance of session initiation including the IUT request related information may be determined based on IUT restriction set with respect to the remote end 300. For example, such a determination may be triggered by selection, input, etc. of the user of the remote end 300 or depending on whether a predetermined criterion set with respect to the remote end 300 is satisfied. Such a determination may be made by a node serving the remote end 300. In the example of FIG. 16, assume that the remote end 300 accepts session initiation including the IUT request related information.

In steps 6*a* and 6*b* of FIG. 16, the remote end 300 may transmit a session initiation acceptance message with respect to the session update request including the IUT request related information, which is transmitted by the SCC AS 520. The session initiation acceptance message may be an SIP based 200 OK message, a message, in which information (e.g., a predetermined parameter or indicator) indicating that the IUT request can be accepted is additionally included in an existing SIP response message, or an SIP response newly defined to indicate acceptance of the IUT initiation request including the IUT request.

In steps 7*a* and 7*b* of FIG. 16, the SCC AS 520, which has received the session initiation acceptance message from the remote end 300, decides to initiate the session including IUT operation requested by the UE-1 110. Then, the SCC AS 520 may transmit a response message (e.g., a session setup response message) indicating that the requested session initiation has finished to the UE-1 110. The response message may be an SIP based 200 OK message, for example. Steps 7*a* and 7*b* may include all operations required to finish connection of the Media-A flow to the UE-1 110 in addition to transmission of only the response message indicating that the requested session initiation has finished to the UE-1 110.

In steps 8*a* and 8*b* of FIG. 16, the SCC AS 520, which has decided to initiate the session including IUT operation requested by the UE-1 110, may transmit a response message (e.g., a session setup response message) indicating that session initiation has finished to the UE-2 120. The response message may be an SIP based 200 OK message, for example. Steps 8*a* and 8*b* may include all operations required to finish connection of the Media-B flow to the UE-2 120 in addition to transmission of only the response message indicating that the requested session initiation has finished to the UE-2 120.

For details of establishment of a collaborative session at the session originating point of FIG. 16, 3GPP TS 24.337 is incorporated by reference.

After steps 8*a* and 8*b* of FIG. 16, the collaborative session in which the UE-1 110 having Media-A and the UE-2 120 having Media-B participate may be established and the UE-1 110 becomes a controller UE and the UE-2 120 becomes a controlled UE.

Next, a detailed example of the present invention will be described with reference to FIG. 17.

In the example of FIG. 17, assume that the remote end 300 (or the user of the remote end 300), which has received the session update initiation message, rejects session initiation including IUT operation based on IUT restriction.

Steps 1*a* to 5*b* of FIG. 17 are equal to steps 1*a* to 5*b* of FIG. 16 and a description thereof will be omitted.

In steps 6a and 6b of FIG. 17, the remote end 300, which has received the session initiation request message, may transmit a session initiation rejection message to the SCC AS 520 via the IMS node 510. The session initiation rejection message may be one of existing SIP based response 4xx messages indicating that the session initiation request has not been normally processed, a message, in which information indicating that the IUT request cannot be accepted is additionally included in an existing SIP response message (e.g., a predetermined parameter or indicator), or an SIP response message newly defined to indicate that the session initiation request including the IUT request has been rejected.

If the remote end 300 cannot accept the session initiation request including the IUT request, establishment of the session between any one or both of the UE-1 110 or the UE-2 120 and the remote end 300 is not accepted based on IUT restriction of the remote end 300.

In steps 7a and 7b of FIG. 17, the SCC AS 520, which has received the session initiation rejection message from the remote end 300, may decide not to initiate the session including IUT operation requested by the UE-1 110. Then, a response (e.g., a session setup response message) indicating that the session initiation request is cancelled (or rejected) may be transmitted to the UE-1 110.

In steps 8a and 8b of FIG. 17, the SCC AS 520, which has decided to not initiate the session IUT operation requested by the UE-1 110, may transmit a response message (e.g., a session setup response message) indicating that the session initiation request is cancelled (or rejected) to the UE-2 120.

Here, the session initiation cancellation message may be one of existing SIP based response 4xx messages indicating that the session initiation request has not been normally processed, a message, in which information indicating that the IUT request cannot be accepted is additionally included in an existing SIP response message (e.g., a predetermined parameter or indicator), or an SIP response message newly defined to indicate that the session initiation request including the IUT request has been cancelled.

Steps 7a and 7b and steps 8a and 8b of FIG. 17 may include all operations (e.g., operation for releasing the access legs of the UE-1 110 and the UE-2 120) for recovering operations, which were performed to respectively connect the Media-A and Media-B flows to the UE-1 110 and the UE-2 120 in the previous steps, to original states, in addition to transmission of the response message indicating that session initiation has been cancelled to the UE-1 110 and the UE-2.

As the result of operation shown in FIG. 17, the session between the UE-1 110 and the UE-2 120 and the remote end 300 is not established.

Figure 18:
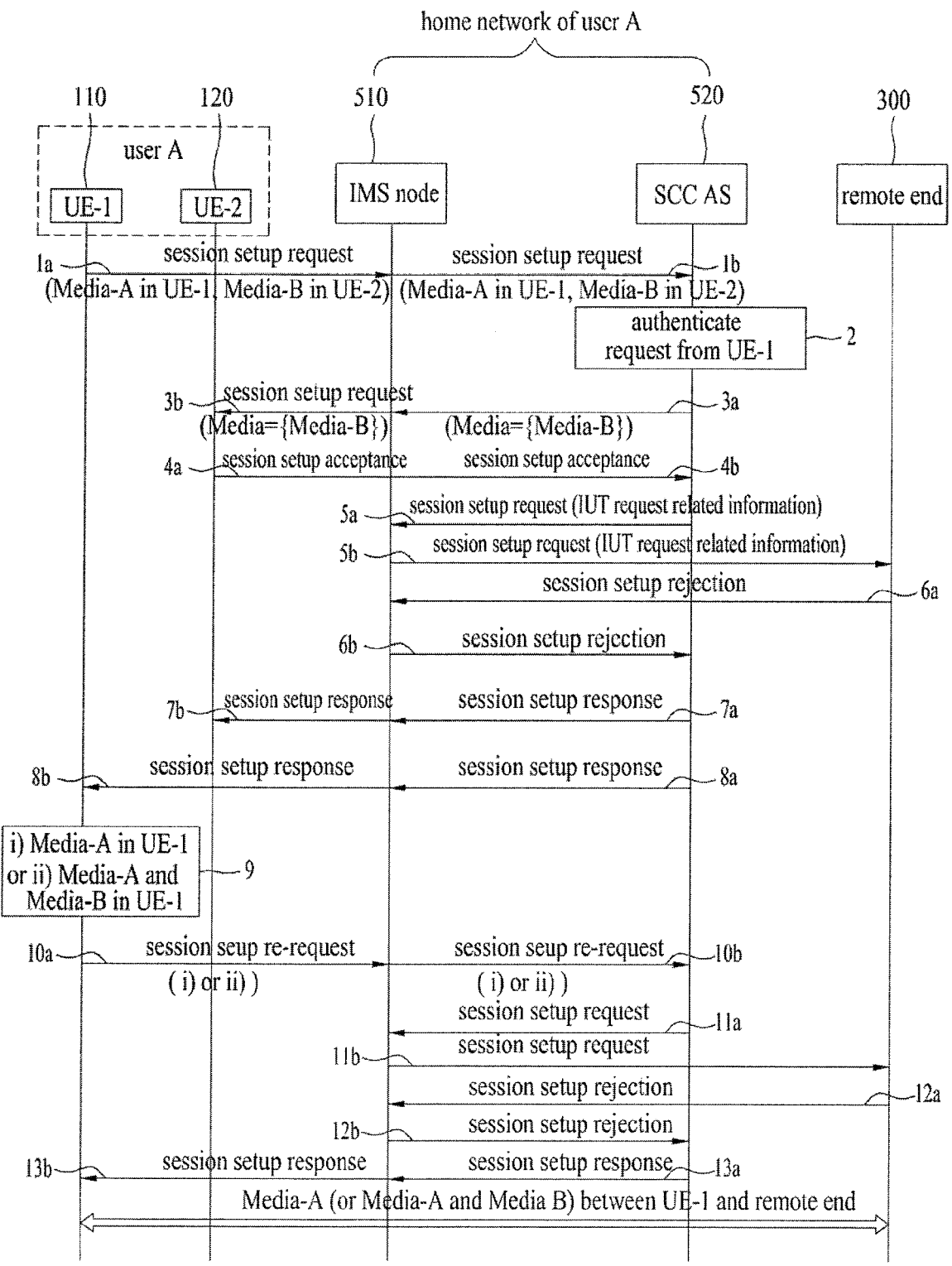

FIG. 18 is a diagram showing a modified example of FIG. 17.

In the example of FIG. 18, if the collaborative session initiation request is rejected by the remote end 300, the session may be established based on operator policy, user preference (that is, user preference of the UE-1 110 for requesting session initiation) and/or UE capability. That is, while overall acceptance/rejection of the collaborative session request is shown in FIGS. 16 and 17, a normal session (or a collaborative session) including other session(s) excluding the session which is not accepted by IUT restriction may be established in the example of FIG. 18. In the example of FIG. 18, assume that establishment of the session for the UE-2 120 is not accepted but establishment of the session for the UE-1 110 is accepted by IUT restriction of the remote end 300.

Steps 1a to 6b of FIG. 18 are equal to steps 1a to 6b of FIG. 17 and thus a description thereof will be omitted.

In steps 7a and 7b of FIG. 18, the SCC AS 520, which has received the session initiation rejection message from the remote end 300, may transmit the response message (e.g., the session setup response message) indicating that the requested session initiation has been cancelled (or rejected) to the UE which generates the session initiation request (that is, UE(s) excluding the UE-1 110) (the UE-2 120 in this example) via the IMS node 510.

In steps 8a and 8b of FIG. 18, the SCC AS 520 may transmit the response message in response to the session initiation request to the UE-1 110 which generates the session initiation request via the IMS node 510. This response message is not a session initiation cancellation message, but is a message indicating that the access leg for Media-B cannot be set in the UE-2 120 (a new parameter and/or indicator is added to an existing message or a new message may be defined). That is, the response message of steps 8a and 8b may be understood as a message explicitly informing the UE-1 110 that the collaborative session cannot be established.

In step 9 of FIG. 18, the UE-1 110 may determine i) whether the session including only Media-A without Media-B is established between the UE-1 110 and the remote end 300 or ii) whether the session including both Media-A and Media-B is established between the UE-1 110 and the remote end 300, based on user preference and/or UE capability (e.g., whether the codec of Media-B is supported, etc.) set with respect to the UE.

Alternatively, in step 9 of FIG. 18, if the UE-1 110 receives the message of steps 8a and 8b (that is, the message indicating that the access leg for Media-B cannot be set in the UE-2 120) from the SCC AS 520, the UE-1 110 may decide not to establish the session (that is, establishment cancellation decision) instead of decision of i) or ii). In this case, the session establishment cancellation decision may be reported to the SCC AS 520 and thus the SCC AS 520 may perform operation for cancelling session establishment (e.g., operation for releasing the access leg for Media-A in the UE-1 110)(not shown). In the following description, assume that the UE-1 110 decides one of i) or ii).

In steps 10a and 10b of FIG. 18, the UE-1 110 may transmit a session initiation re-request message including session information according to i) or ii) to the SCC AS 520 via the IMS node 510. In steps 10a and 10b, the message transmitted from the UE-1 110 may be defined as a response message in response to the message transmitted from the SCC AS 520 in steps 8a and 8b.

In steps 11a and 11b of FIG. 18, the session with the remote end 300 may be established based on the message received from the UE-1 110. This may include remote leg update operation with the remote end 300.

In steps 12a and 12b of FIG. 18, if the session initiation request of the UE-1 110 is accepted, the remote end 300 may transmit a response message indicating acceptance to the SCC AS 520 via the IMS node 510.

In steps 13a and 13b of FIG. 18, the SCC AS 520 may transmit the session initiation response message to the UE-1 110 via the IMS 510.

Then, the session (that is, the normal session) including Media-A (or both Media-A and Media-B) may be established between the remote end 300 and the UE-1 110.

The principle of the present invention described using the example of FIG. 18 is equally applicable to the collaborative session initiation request including three or more UEs. For example, if a collaborative session in which three or more UEs participate is requested to be initiated and a session for any one of the three or more UEs is rejected by IUT restriction of the remote end 300, normal session initiation may not be requested but collaborative session initiation may be requested, in the session initiation re-request step (steps 10a and 10b of FIG. 18).

In the example of FIGS. 16 to 18, if initiation of the collaborative session including IUT is requested in the session initiation step, the access legs for the UE-1 110 and the UE-2 120 are preferentially set without waiting until the remote end accepts IUT and then are released if IUT is rejected. Accordingly, if the remote end accepts collaborative session initiation including IUT, collaborative session initiation may be stably finished via the access legs.

Embodiment 6

Embodiment 6 relates to an example of applying IUT restriction operation in the case in which a user side is a session originating point, a remote end is a session terminating point and a collaborative session is established between UEs belonging to the same subscriber when the user side initiates the session.

Figure 19:
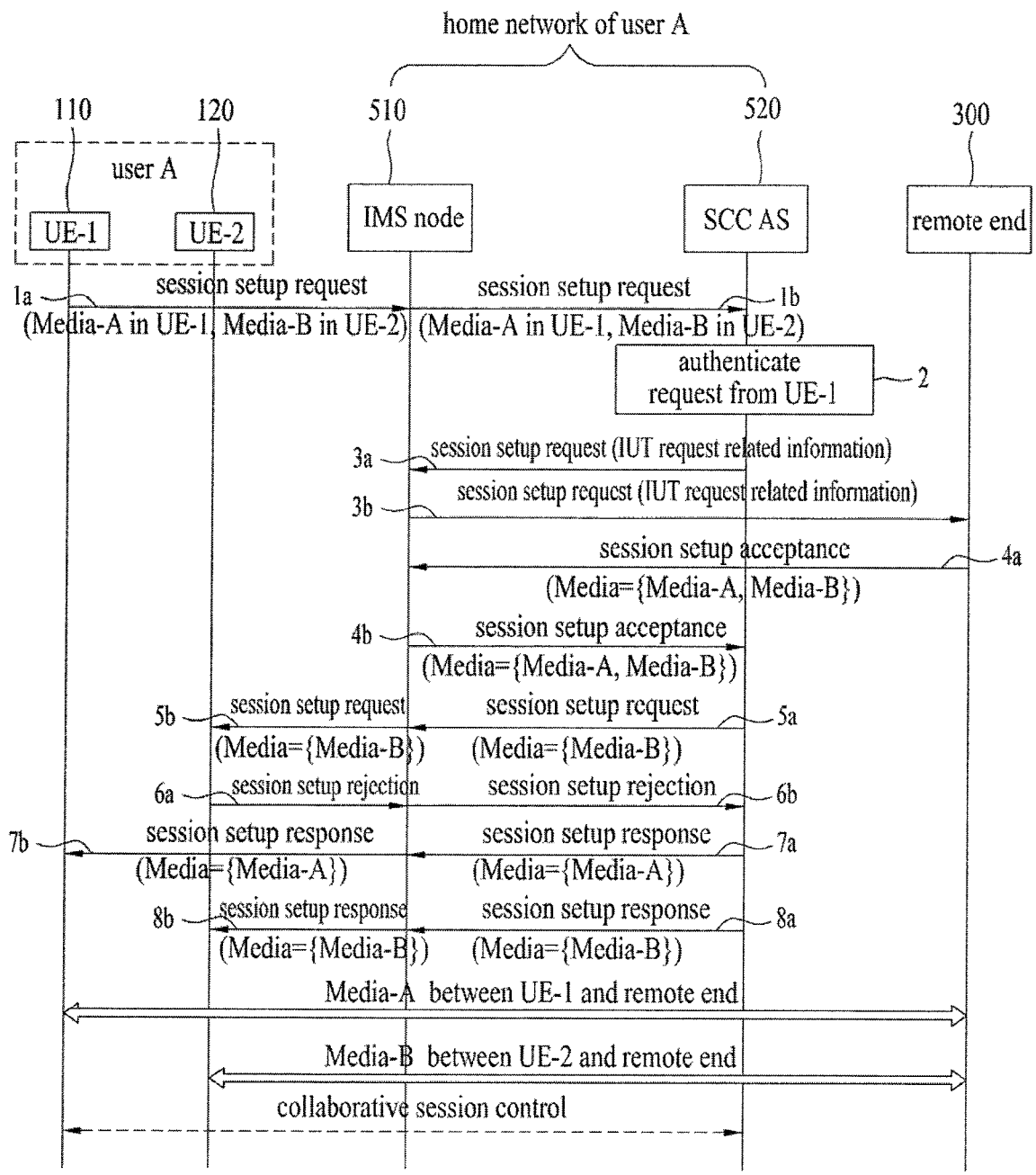
Figure 20:
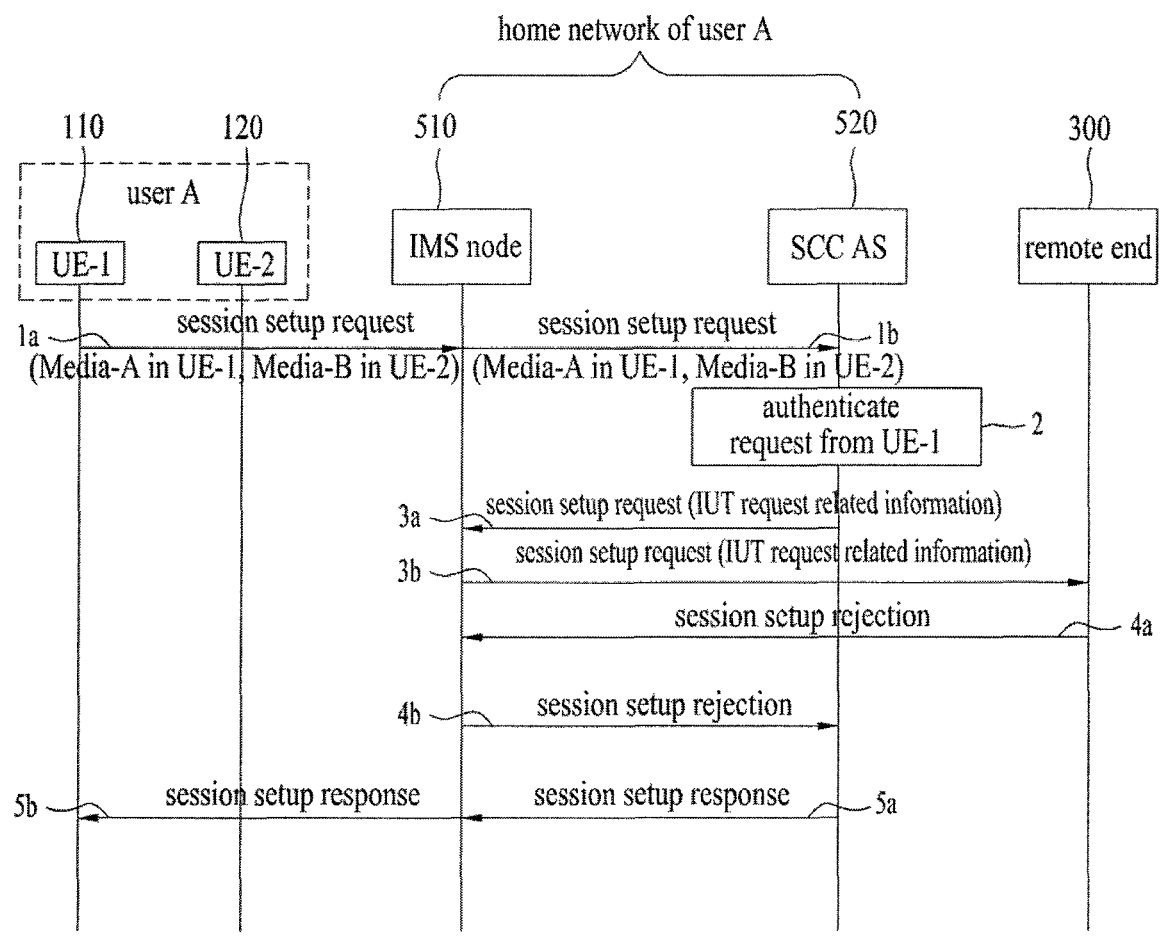
Figure 21:
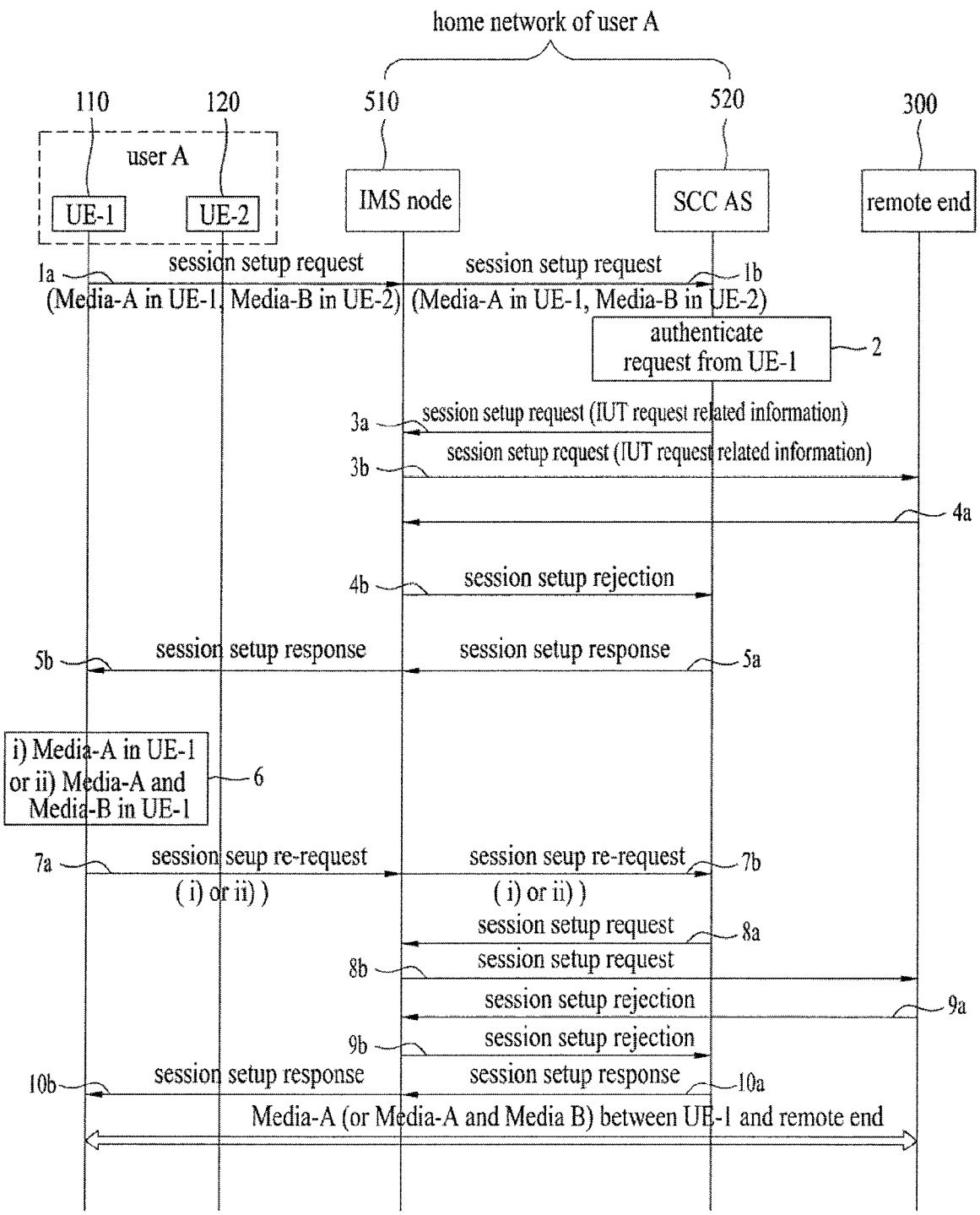

FIGS. 19 to 21 are flowcharts illustrating examples of IUT restriction operations in case of a session initiation request including IUT.

In the example of FIG. 19, steps (steps 5a, 5b, 6a and 6b of FIG. 16) of transmitting a session initiation request to the remote end and receiving a response thereto are first performed, without immediately performing steps (that is, steps 3a, 3b, 4a and 4b) of FIG. 16) of transmitting a session initiation request to the UE-2 120 and receiving a response thereto after the SCC AS 520 receives and authenticates a session initiation request from the UE-1 110, unlike the example of FIG. 16. In step 3a of FIG. 19, another message (an existing message or a newly defined message) including IUT request related information may be used instead of the session initiation request message. In addition, in step 4a of FIG. 19, another message (an existing message or a newly defined message) indicating IUT request acceptance may be used instead of the session initiation acceptance message. The description of the steps is equal to that of the example of FIG. 16 and thus a description thereof will be omitted.

The example of FIG. 20 relates to an example of performing steps (steps 5a, 5b, 6a and 6b of FIG. 17) of, at the SCC AS 520, transmitting the session initiation request to the remote end and receiving a response thereto after receiving and authenticating a session initiation request from the UE-1 110, unlike the example of FIG. 17. In step 3a of FIG. 20, another message (an existing message or a newly defined message) including IUT request related information may be used instead of the session initiation request message. In addition, in step 4a of FIG. 20, another message (an existing message or a newly defined message) indicating IUT request rejection may be used instead of the session initiation rejection message. In this case, in the example of FIG. 20, if the remote end 300 transmits a response indicating that the session initiation request including IUT is not accepted based on IUT restriction, the SCC AS 520 does not perform operation (steps 3a, 3b, 4a and 4b of FIG. 17) for requesting session initiation from the UE-2 120 and receiving the response thereto and operation (steps 8a and 8b of FIG. 17) for transmitting session initiation rejection from the remote end 300 to the UE-2 120. In the example of FIG. 20, the SCC AS 520, which has received the session initiation rejection message from the remote end 300, may transmit a cancellation message in response to the session initiation request including IUT to the UE-1 110 via the IMS node 510.

In the example of FIG. 21, similarly to the example of FIG. 20, the SCC AS 520, which has received the session initiation request including IUT from the UE-1 110, first performs a session initiation request/response procedure with the remote end 300 and does not perform the session initiation request/response procedure between the SCC AS 520 and the UE-2 120 if the remote end 300 rejects the session initiation request by IUT restriction. Steps 5a to 10b of FIG. 21 correspond to steps 8a to 13b of FIG. 18 and thus a description thereof will be omitted.

In the example of FIGS. 19 to 21, if the session initiation request including IUT operation is present, the access leg for the UE-2 120 is not immediately set but a determination as to whether the access leg for the UE-2 120 is set is made depending on the remote end accepts/rejects IUT in consideration of IUT restriction. Accordingly, if the remote end rejects IUT, unnecessary setting and then release of the access leg may be prevented.

Embodiment 7

Embodiment 7 relates to an example of applying IUT restriction operation in the case in which a remote end is a session originating point, a user side is a session terminating point and the user side establishes a collaborative session between UEs belonging to the same subscriber.

Figure 22:
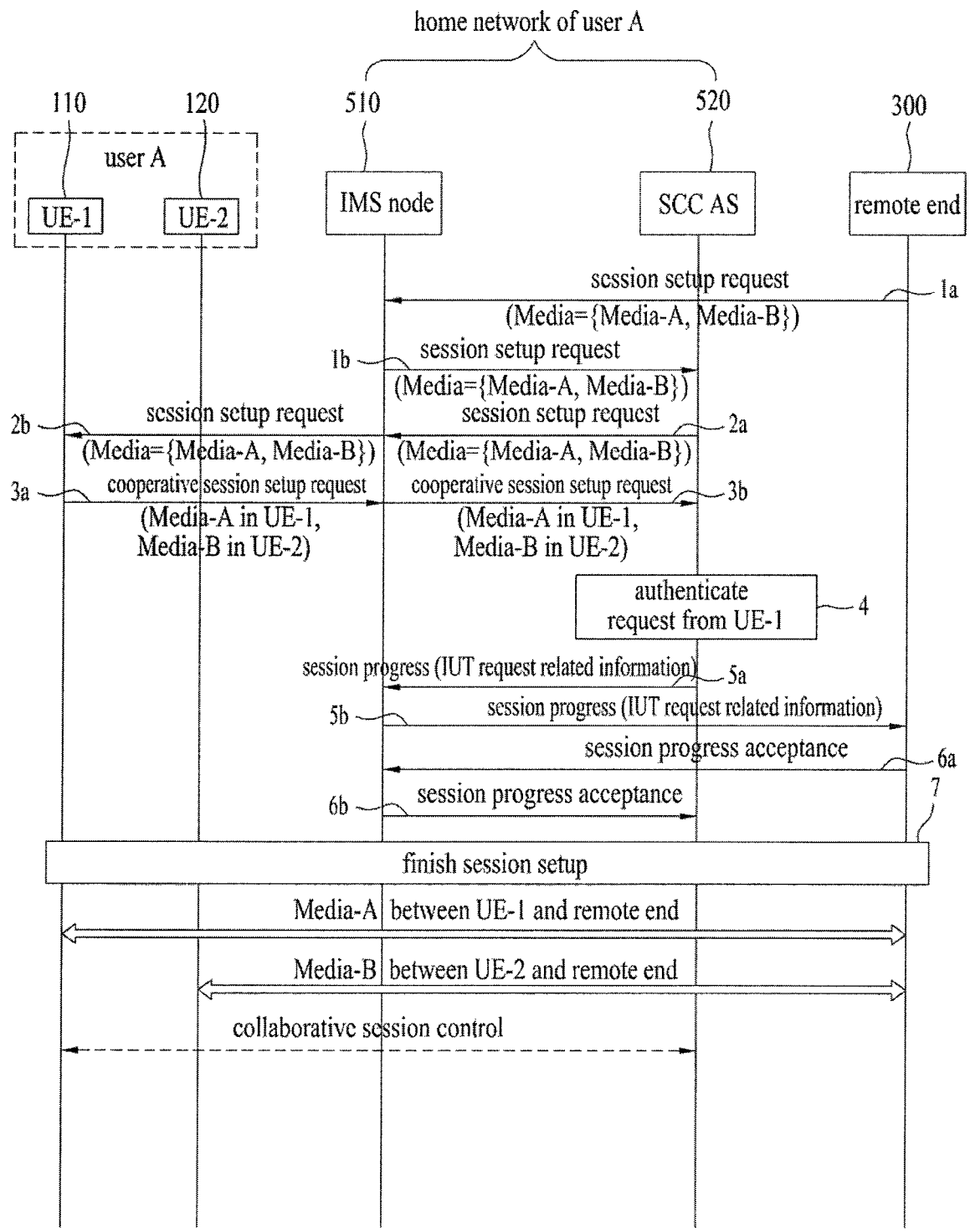
FIGS. 22 and 23 are flowcharts of IUT restriction operation when a user side requests to establish a collaborative session in response to a session establishment request of a remote end.
Figure 23:
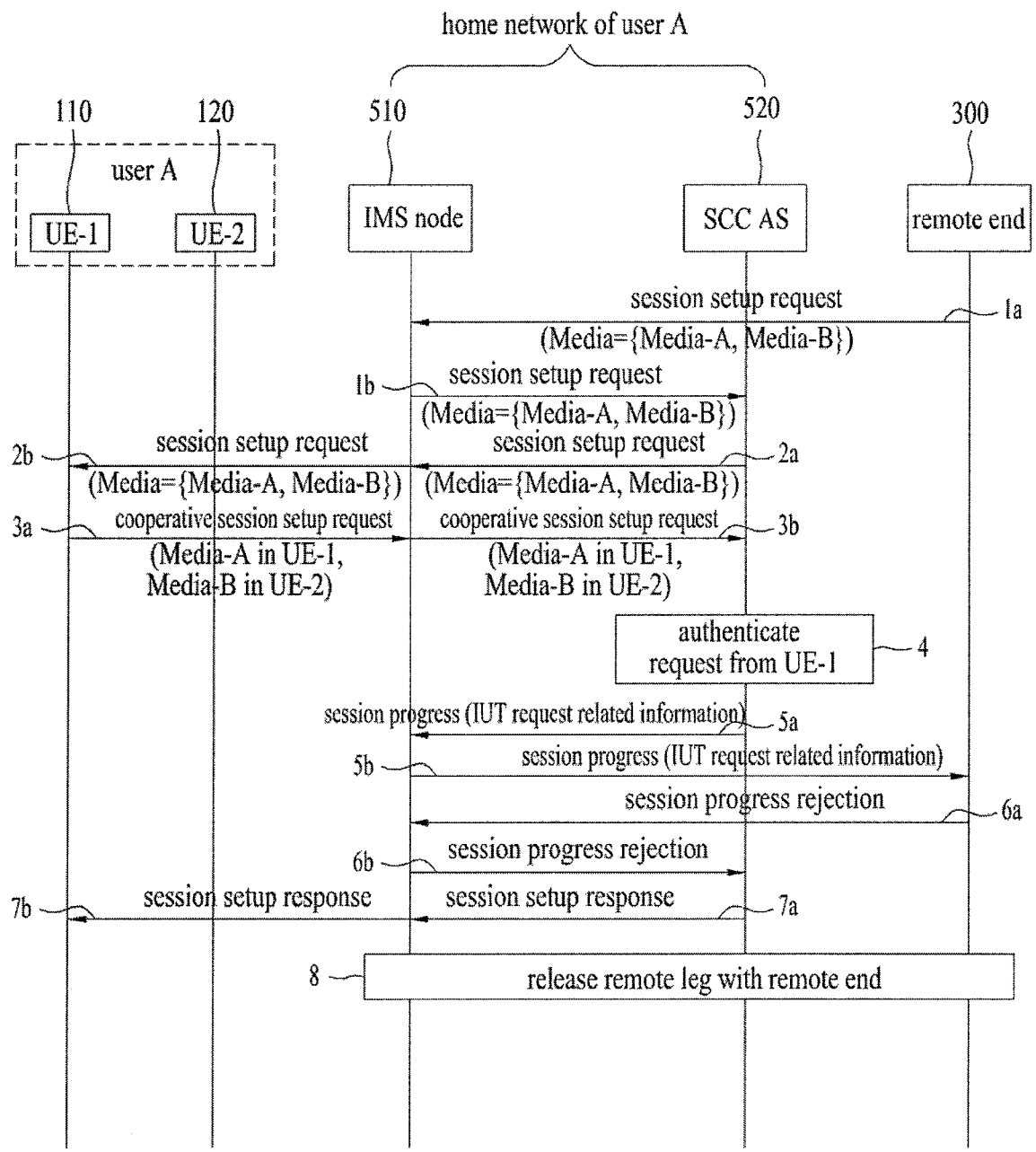

FIGS. 22 and 23 are flowcharts illustrating IUT restriction operation in the case in which a remote end requests to initiate a session and a user side requests to initiate a collaborative session. In the examples of FIGS. 22 and 23, assume that the UE-1 110 and the UE-2 120 belong to a user A. In addition, in the examples of FIGS. 22 and 23, a home network to which the user A subscribes is shown. The home network includes an IMS node 51 and an SCC AS 52. Here, the IMS node 51 includes a CSCF such as a P-CSCF and an S-CSCF.

In the examples of FIGS. 22 and 23, assume that the remote end 300 initiates a session including Media-A and Media-B with the UE-1 110. At this time, the UE-1 110, which has received a session initiation request from the remote end 300, connects Media-A to the UE-1 110 and connects Media-B to the UE-2 120. Then, the user A may establish the collaborative session between the UE-1 110 having Media-A flow and the UE-2 120 having Media-B flow and the controller UE of the collaborative session may become the terminating point of the session of the UE-1 110. FIG. 16 shows the case in which the collaborative session initiation request of the user A is accepted by the remote end 300 and FIG. 17 shows the case in which the collaborative session initiation request of the user A is rejected by the remote end 300.

In steps 1a and 1b of FIG. 22, the remote end 300 may transmit a session initiation request message (e.g., a session setup request message) to the UE-1 110 in order to initiate the session having Media-A and Media-B with the UE-1 110. The session initiation request message may be an SIP based INVITE message, for example, and may be transmitted to the SCC AS 520 which serves the UE-1 110 via the IMS node 510.

In steps 2a and 2b of FIG. 22, the SCC AS 520 may transmit the session initiation request message from the remote end 300 to the UE-1 110 via the IMS node 510.

In steps 3a and 3b of FIG. 22, the UE-1 110 which has received the session initiation request message may transmit a collaborative session initiation request message (e.g., collaborative session setup request message) to the SCC AS 520 via the IMS node 510 such that the UE-1 110 and the UE-2 120 respectively have Media-A and Media-B. The collaborative session initiation request may be an SIP based 300 multiple choices message, for example. Here, the UE-1 110 may have control rights for the collaborative session between the UE-1 110 and the UE-2 120.

In step 4 of FIG. 22, the SCC AS 520 may authenticate or verify the collaborative session initiation request message from the UE-1 110. Such authentication/verification may be performed based on subscriber information. For example, authentication/verification may include determining whether IUT of the UE-1 110 is accepted. Alternatively, authentication/verification may include determining whether the collaborative session with the UE-2 120 can be established when the UE-1 110 becomes the session terminating point. Alternatively, in the example of FIG. 22, the authentication/verification process by the SCC AS 520 may not include verification for IUT restriction or may include only IUT restriction (that is, network-specific IUT restriction) defined by agreement for IUT services of network operators shown in FIG. 7 without verification for user-specific IUT restriction if verification for IUT restriction is included.

In steps 5a and 5b of FIG. 22, the SCC AS 520, which has received the collaborative session initiation request message, may transmit, to the remote end 300, a session progress message (e.g., an SIP based 183 session progress message) informing the remote end 300 that session initiation operation progresses via the IMS node 510.

Steps 5a and 5b of FIG. 22 may correspond to a step of performing a session initiation operation with the remote end at the SCC AS serving the UE-1 110 which is the controller UE of the collaborative session established simultaneously with session initiation, that is, the SCC AS 520. Accordingly, when the SCC AS 520 transmits the session progress message to the remote end, "IUT request related information" may be included in order to inform the remote end that the IUT request is for session initiation.

As described above, information (e.g., IUT request reception indication, information about attributes of IUT operation, information about the target UE of IUT operation, information about a media for IUT operation is performed, etc.) included in the IUT request related information may be specified in an SIP header or a session description protocol (SDP) message. For IUT request related information, one or more new SIP header fields, parameters of SIP header fields, SDP header fields and parameters of the SDP header fields may be defined and used. Alternatively, for IUT request related information, existing header fields or parameters of the header fields may be used. Alternatively, for IUT request related information, existing header fields or parameters of the header fields may be reused and interpreted as new meanings different from the existing meanings. Alternatively, a combination of existing headers/parameters and new headers/parameters may be used to express the IUT request related information. Alternatively, since the IUT request related information is already included in the SIP header and the SDP configuring the session progress message, the IUT request related information may not be included in the session progress message.

In steps 6a and 6b of FIG. 22, the remote end 300 may transmit a message (e.g., a session progress acceptance message) indicating that session progress including IUT operation can be accepted in response to the session progress message including the IUT request related information transmitted by the SCC AS 520. Here, the session progress acceptance message may be an existing SIP based provisional acknowledgement (PRACK) message, a message, in which information (e.g., a predetermined parameter and/or indicator) indicating that the IUT request can be accepted is additionally included in an existing session progress acceptance message, or an SIP response message newly defined to indicate acceptance of the session initiation progress including IUT operation.

Steps 6a and 6b of FIG. 22 may not be performed. More specifically, if the remote end 300 accepts session initiation progress including IUT operation, the response message (e.g., the session progress acceptance message) may not be transmitted and, only if the remote end rejects session initiation progress including IUT operation, the response may be transmitted.

In step 7 of FIG. 22, the SCC AS 520, which has received the session progress acceptance message from the remote end 300, decides to progress with respect to session initiation including IUT operation requested by the UE-1 110. Then, operation for connecting the Media-A flow to the UE-1 110 and connecting the Media-B flow to the UE-2 120 may be performed.

For details of establishment of a collaborative session at the session terminating point of FIG. 22, 3GPP TS 24.337 is incorporated by reference.

After step 7 of FIG. 22, the collaborative session in which the UE-1 110 having Media-A and the UE-2 120 having Media-B participate may be established, the UE-1 110 becomes a controller UE and the UE-2 120 becomes a controlled UE.

Next, a detailed example of the present invention will be described with reference to FIG. 23.

Steps 1a to 5b of FIG. 23 are equal to steps 1a to 5b of FIG. 22 and thus a description thereof will be omitted.

In steps 6a and 6b of FIG. 23, the remote end 300 may transmit a message (e.g., a session progress rejection message) indicating that session progress including IUT operation cannot be accepted in response to the session progress message including the IUT request related information transmitted by the SCC AS 520. The session progress rejection message transmitted by the remote end 300 may be one of existing SIP based response 4xx messages indicating that the session progress request has not been normally processed, a message, in which information indicating that the IUT progress request cannot be accepted is additionally included in an existing SIP response message (e.g., a predetermined parameter or indicator), or an SIP response message newly defined to indicate that session initiation progress including the IUT request has been rejected.

In steps 7a and 7b of FIG. 23, the SCC AS 520, which has received the session progress rejection message from the remote end 300, may decide not to progress with respect to session initiation including IUT operation requested by the UE-1 110. Then, the SCC AS 520 may transmit a response message (e.g., a collaborative session setup response message) informing the UE-1 110 of cancellation (or rejection) of the collaborative session establishment request. The collaborative session initiation cancellation message may be one of existing SIP based response 4xx messages indicating that the collaborative session initiation request has not been normally processed, a message, in which information indicating that the IUT progress request cannot be accepted is additionally included in an existing SIP response message (e.g., a predetermined parameter or indicator), or an SIP response message newly defined to indicate that the collaborative session initiation request including the IUT request has been rejected.

In addition, steps 7a and 7b of FIG. 23 may include all operations for recovering operations, which were performed in order to connect the Media-A flow to the UE-1 110, to original states, in addition to transmission of the response message informing the UE-1 110 that collaborative session initiation has been cancelled.

In step 8 of FIG. 23, the SCC AS 520, which has decided not to progress with respect to session initiation including IUT operation requested by the UE-1 110, may release the remote leg with the remote end 300.

As the result of operation shown in FIG. 23, a session among the UE-1 110, the UE-2 120 and the remote end 300 is not established.

In the examples of FIGS. 22 and 23, although the method of including the IUT request related information in the session progress message transmitted in order to inform the remote end 300 that session initiation operation is being performed, the present invention is not limited thereto and the IUT request related information may be included in any message if the SCC AS transmits the message to the remote end in collaborative session establishment upon terminating session setup.

Although the UE-1 110 and the UE-2 120 belong to the same IMS subscription in Embodiments 5 to 7, the present invention is not limited thereto and the principle of the present invention is equally applicable to the case in which the UE-1 110 and the UE-2 120 belong to different IMS subscriptions (e.g., both the UE-1 110 and the UE-2 120 belong to one subscriber) and/or are served by different SCC ASs. If the UE-1 110 and the UE-2 120 are served by different SCC ASs, the IUT request related information is included in the session initiation request or session progress message transmitted by the remote end and the SCC AS, which has received a response thereto from the remote end, becomes a hosting SCC AS.

Details of the above-described various embodiments of the present invention may be independently applied or 2 or more embodiments may be applied at the same time.

Figure 24:
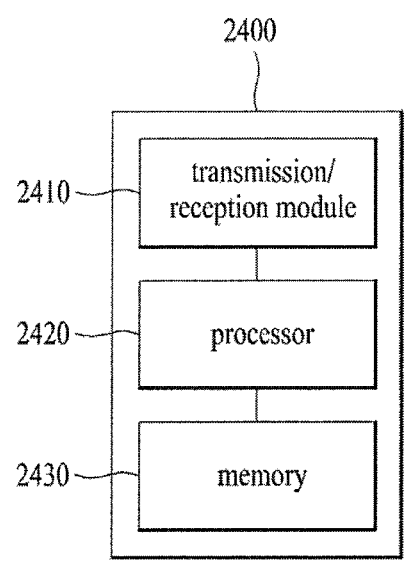
FIG. 24 is a diagram showing the configuration of a transmission/reception device according to an exemplary embodiment of the present invention.

FIG. 24 illustrates the configuration of a transmission/reception device according to an exemplary embodiment of the present invention.

Referring to FIG. 24, the transmission/reception device 2400 according to the present invention may include a transmission/reception module 2420, a processor 2420 and a memory 2430. The transmission/reception module 2410 may be configured to transmit and receive various signals, data, and information to and from an external device. The transmission/reception device 2400 may be connected to the external device by wires and/or wirelessly. The processor 2420 may control overall operation of the transmission/reception device 2400 and perform a calculation/operation process on information to be transmitted and received to and from the external device. The memory 2430 may store the operated information for a predetermined period of time, and the memory 2430 may be replaced by another element, such as a buffer (not shown).

The transmission/reception device 1900 according to one embodiment of the present invention may be configured to perform IUT operation related to a first UE and a second UE. The processor 2420 of the transmission/reception device 2400 may be configured to receive a message including an IUT request from the first UE via the transmission/reception module 2410. In addition, the processor 2420 may be configured to transmit IUT request related information to a remote end via the transmission/reception module 2410. In addition, the processor 2420 may be configured to perform IUT operation if the remote end accepts the IUT request. In addition, the processor 2420 may be configured not to perform IUT operation if the remote end rejects the IUT request. A criterion used to accept/reject the IUT request at the remote end may be determined by IUT restriction set with respect to the remote end. The transmission/reception device 2400 may be an SCC AS, for example.

In the above-described detailed configuration of the transmission/reception device 2400, details of the above-described various embodiments of the present invention may be independently applied or 2 or more embodiments may be applied at the same time. In this case, overlapping details will be omitted from the description for simplicity and clarity.

The above-described embodiments of the present invention can be implemented by a variety of means, for example, hardware, firmware, software, or a combination of them. In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention are applicable to various mobile communication systems.

The invention claimed is:

1. A method of, at an internet protocol multimedia subsystem (IMS) network device, performing inter-user equipment (UE) transfer (IUT) operation between a first UE and a second UE, the method comprising:
receiving a first message including an IUT request associated with a first media from the first UE;
transmitting IUT request related information to a remote end;

performing the IUT operation if the remote end accepts the IUT request; and when the remote end rejects the IUT request:
- transmitting, to the second UE, a first response message indicating that the IUT request has been rejected;
- transmitting, to the first UE, a second response message indicating that setting an access leg for the first media on the second UE is disabled; and
- receiving, from the first UE, a second message related with session re-establishment which is determined based on at least one of a user preference or UE capability set with the first UE, wherein the second message indicates whether a session including only a second media is established or a session including both the first and the second medias is established.

2. The method according to claim 1, wherein, if the remote end restricts the IUT request, the IUT operation is not performed.

3. The method according to claim 1, wherein the first message including the IUT request is transmitted from the first UE in one of:
- the case in which a media flow progresses between the first UE and the remote end,
- the case in which a media flow progresses between the second UE and the remote end,
- the case in which initiation of a session including a media flow between the first UE and the remote end and a media flow between the second UE and the remote end is requested, or
- the case in which a session initiation request for the first UE is transmitted from the remote end to the first UE.

4. The method according to claim 1, wherein the transmitting the IUT request related information to the remote end is performed in one or more of:
- the case in which authentication or verification of one or more of a source UE of the IUT request or a target UE of the IUT request is successful,
- the case in which the transmitting the IUT request related information to the remote end is accepted by operator policy, or
- the case in which the transmitting the IUT request related information to the remote end is accepted by preference of one or more of the source UE of the IUT request or the target UE of the IUT request.

5. The method according to claim 1, wherein the IUT request related information includes at least one of information indicating reception of the IUT request, attributes of the requested IUT operation, identification of a target UE of the requested IUT operation, or information about a media flow related to the requested IUT operation.

6. The method according to claim 5, wherein the attributes of the requested IUT operation indicates one or more of session initiation requests including media transfer, replication, addition or IUT operation.

7. The method according to claim 1, wherein the transmitting the IUT request related information to the remote end is performed after setting an access leg with a target UE of a media flow related to the IUT operation or before setting an access leg with a target UE of a media flow related to the IUT operation.

8. The method according to claim 1, further comprising receiving, from the remote end, a message indicating that the IUT request is accepted.

9. The method according to claim 1, wherein the IMS network device is a service centralization and continuity application server (SCC AS) which serves a UE for controlling a collaborative session established by the IUT operation.

10. The method according to claim 1, wherein the receiving the first message and the transmitting the IUT request related information are performed via a call session control function (CSCF).

11. An Internet protocol multimedia subsystem (IMS) network device which performs inter-UE transfer (IUT) operation between a first user equipment (UE) and a second UE, the IMS network device comprising:
- a transmission/reception module configured to transmit and receive a signal to and from an external device; and
- a processor configured to control the transmission/reception module, wherein the processor is configured to:
- receive a first message including an IUT request associated with a first media from the first UE via the transmission/reception module,
- transmit IUT request related information to a remote end via the transmission/reception module,
- perform the IUT operation if the remote end accepts the IUT request,
- transmit, to the second UE, a first response message indicating that the IUT request has been rejected, when the remote end rejects the IUT request,
- transmit, to the first UE, a second response message indicating that setting an access leg for the first media on the second UE is disabled, when the remote end rejects the IUT request, and
- receive, from the first UE, a second message related with session re-establishment which is determined based on at least one of a user preference or UE capability set with the first UE, when the remote end rejects the IUT request, and wherein the second message indicates whether a session including only a second media is established or a session including both the first and the second medias is established.

* * * * *